United States Patent
McCulley et al.

(10) Patent No.: US 10,425,511 B2
(45) Date of Patent: Sep. 24, 2019

(54) METHOD AND APPARATUS FOR MANAGING ROUTING DISRUPTIONS IN A COMPUTER NETWORK

(71) Applicant: 128 Technology, Inc., Burlington, MA (US)

(72) Inventors: Scott A. McCulley, Groton, MA (US);
Anna Yungelson, Lexington, MA (US);
Hadriel S. Kaplan, Nashua, NH (US);
Michael Baj, Somerville, MA (US)

(73) Assignee: 128 TECHNOLOGY, INC., Burlington, MA (US)

( * ) Notice: Subject to any disclaimer, the term of this patent is extended or adjusted under 35 U.S.C. 154(b) by 99 days.

(21) Appl. No.: 15/419,480

(22) Filed: Jan. 30, 2017

(65) Prior Publication Data

US 2018/0219980 A1     Aug. 2, 2018

(51) Int. Cl.
*H04L 29/06*     (2006.01)
*H04L 1/00*     (2006.01)
(Continued)

(52) U.S. Cl.
CPC ............ *H04L 69/22* (2013.01); *H04L 1/0006* (2013.01); *H04L 1/0041* (2013.01);
(Continued)

(58) Field of Classification Search
CPC ....... H04L 69/22; H04L 45/74; H04L 69/326; H04L 69/16; H04L 1/0041;
(Continued)

(56) References Cited

U.S. PATENT DOCUMENTS

| 6,515,963 B1 | 2/2003 | Bechtolsheim et al. |
| 6,563,824 B1 | 5/2003 | Bhatia et al. |
| (Continued) | | |

FOREIGN PATENT DOCUMENTS

| CN | 101552703 A | 10/2009 |
| CN | 101646220 A | 2/2010 |
| (Continued) | | |

OTHER PUBLICATIONS

Hueschkel et al., "VirtualStack: SDN-controlled Transparent Protocol Transitions at the Edge", Oct. 26-29, 2015, IEEE, 2015 IEEE 40th Conference on Local Computer Networks (LCN) (Year: 2015).*
(Continued)

*Primary Examiner* — Paul H Masur
*Assistant Examiner* — Michael K Phillips
(74) *Attorney, Agent, or Firm* — Nutter McClennen & Fish LLP

(57) ABSTRACT

A routing method checks a network path selected for transmitting a stream of packets between a first routing node and a second routing node in a computer network. The stream of packets complies with a first transport protocol. The method forwards, from the first routing node toward the second routing node, a set of handshake packets. The set of handshake packets includes change information indicating a change in the transport protocol for a plurality of the packets in the stream. The method modifies the plurality of packets in the stream ("modified packets"). Specifically, the method modifies the first transport protocol header in the plurality of packets in the stream to have a second transport protocol header of a second transport protocol. This modification preferably does not increase the packet size of each of modified packets.

28 Claims, 17 Drawing Sheets

(51) Int. Cl.
*H04L 12/741* (2013.01)
*H04L 29/08* (2006.01)
*H04L 1/18* (2006.01)

(52) U.S. Cl.
CPC ............ *H04L 1/1867* (2013.01); *H04L 45/74* (2013.01); *H04L 69/16* (2013.01); *H04L 69/326* (2013.01)

(58) Field of Classification Search
CPC ........... H04L 29/06102; H04L 29/0653; H04L 29/0863; H04L 29/08783; H04L 49/3009; H04L 49/9042; H04L 67/147; H04L 69/04; H04L 69/161
See application file for complete search history.

(56) References Cited

U.S. PATENT DOCUMENTS

| | | | |
|---|---|---|---|
| 6,584,071 B1 | 6/2003 | Kodialam et al. | |
| 6,721,334 B1 | 4/2004 | Ketcham | |
| 6,738,387 B1 | 5/2004 | Lin et al. | |
| 6,778,531 B1 | 8/2004 | Kodialam et al. | |
| 6,798,743 B1 | 9/2004 | Ma et al. | |
| 7,020,143 B2 | 3/2006 | Zdan | |
| 7,035,214 B1 | 4/2006 | Seddigh et al. | |
| 7,106,739 B2 | 9/2006 | Beier | |
| 7,154,902 B1 | 12/2006 | Sikdar | |
| 7,218,632 B1 | 5/2007 | Bechtolsheim et al. | |
| 7,315,541 B1 | 1/2008 | Housel et al. | |
| 7,373,660 B1 | 5/2008 | Guichard et al. | |
| 7,466,703 B1 | 12/2008 | Arunachalam et al. | |
| 7,536,720 B2 | 5/2009 | Burdett et al. | |
| 7,617,337 B1* | 11/2009 | Beck | H04L 65/80 370/229 |
| 7,634,805 B2 | 12/2009 | Aroya | |
| 7,706,411 B2 | 4/2010 | Wakumoto et al. | |
| 7,730,301 B2 | 6/2010 | Correll et al. | |
| 7,773,611 B2 | 8/2010 | Booth, III et al. | |
| 7,872,973 B2 | 1/2011 | Sterne et al. | |
| 7,965,721 B1* | 6/2011 | Gunasekara | H04L 12/66 370/401 |
| 8,068,417 B1 | 11/2011 | Roberts | |
| 8,094,560 B2 | 1/2012 | Bagepalli et al. | |
| 8,139,479 B1 | 3/2012 | Raszuk | |
| RE44,119 E | 4/2013 | Wang et al. | |
| 8,437,248 B2 | 5/2013 | Li et al. | |
| 8,527,641 B2 | 9/2013 | Degaonkar et al. | |
| 8,570,893 B2 | 10/2013 | Guo et al. | |
| 8,584,199 B1 | 11/2013 | Chen et al. | |
| 8,634,428 B2 | 1/2014 | Le Pennec et al. | |
| 8,804,489 B2 | 8/2014 | Lu et al. | |
| 8,942,085 B1 | 1/2015 | Pani et al. | |
| 8,989,020 B2 | 3/2015 | So | |
| 9,021,134 B1* | 4/2015 | Patel | H04L 67/2823 709/246 |
| 9,059,920 B2 | 6/2015 | Ravindran et al. | |
| 9,160,652 B2 | 10/2015 | Taillon et al. | |
| 9,240,953 B2 | 1/2016 | Carlstrom | |
| 9,276,864 B1 | 3/2016 | Vincent | |
| 2001/0030649 A1 | 10/2001 | Mamiya et al. | |
| 2002/0044553 A1 | 4/2002 | Chakravorty | |
| 2002/0075883 A1 | 6/2002 | Dell et al. | |
| 2002/0176363 A1 | 11/2002 | Durinovic-Johri et al. | |
| 2003/0198189 A1 | 10/2003 | Roberts et al. | |
| 2003/0214938 A1 | 11/2003 | Jindal et al. | |
| 2004/0024985 A1* | 2/2004 | Hudson | G06F 12/0292 711/203 |
| 2004/0088542 A1 | 5/2004 | Daude et al. | |
| 2004/0246964 A1* | 12/2004 | Grimminger | H04L 12/4633 370/392 |
| 2004/0264481 A1 | 12/2004 | Darling et al. | |
| 2005/0036616 A1 | 2/2005 | Huang et al. | |
| 2005/0063307 A1 | 3/2005 | Samuels et al. | |
| 2005/0182932 A1 | 8/2005 | Wheeler | |
| 2005/0238022 A1 | 10/2005 | Panigrahy | |
| 2006/0176894 A1 | 8/2006 | Oh et al. | |
| 2007/0171825 A1 | 7/2007 | Roberts et al. | |
| 2007/0171826 A1 | 7/2007 | Roberts et al. | |
| 2008/0214175 A1 | 9/2008 | Papadoglou et al. | |
| 2009/0007021 A1 | 1/2009 | Hayton | |
| 2009/0059958 A1 | 3/2009 | Nakata | |
| 2010/0125898 A1 | 5/2010 | Dubuc et al. | |
| 2010/0191968 A1 | 7/2010 | Patil et al. | |
| 2010/0322238 A1 | 12/2010 | Denis-Courmont et al. | |
| 2012/0144061 A1 | 6/2012 | Song | |
| 2012/0236860 A1 | 9/2012 | Kompella et al. | |
| 2013/0227166 A1 | 8/2013 | Ravindran et al. | |
| 2013/0297824 A1 | 11/2013 | Lan et al. | |
| 2014/0040488 A1 | 2/2014 | Small et al. | |
| 2015/0016446 A1 | 1/2015 | Scott | |
| 2015/0058492 A1* | 2/2015 | Meloche | H04L 69/40 709/228 |
| 2015/0188814 A1 | 7/2015 | Jain et al. | |
| 2015/0229618 A1 | 8/2015 | Wan et al. | |
| 2015/0237104 A1* | 8/2015 | Oguchi | H04L 65/608 709/231 |
| 2015/0381324 A1 | 12/2015 | Mirsky et al. | |
| 2016/0094444 A1 | 3/2016 | MeLampy et al. | |
| 2017/0339258 A1* | 11/2017 | Momchilov | H04L 69/163 |

FOREIGN PATENT DOCUMENTS

| | | |
|---|---|---|
| CN | 101068242 B | 4/2010 |
| CN | 102158371 A | 8/2011 |
| CN | 101640629 B | 8/2012 |
| CN | 102739507 A | 10/2012 |
| CN | 101207604 B | 3/2013 |
| CN | 102769679 B | 6/2015 |
| CN | 103179192 B | 11/2015 |
| CN | 105245469 A | 1/2016 |
| EP | 1 313 267 B1 | 12/2006 |
| KR | 10-2011-0062994 A | 6/2011 |
| WO | WO 2007/084707 A2 | 7/2007 |
| WO | WO 2007/084755 A2 | 7/2007 |
| WO | WO 2008/043230 A1 | 4/2008 |
| WO | WO 2015/131537 A1 | 9/2015 |

OTHER PUBLICATIONS

International Searching Authority, International Search Report—Application No. PCT/US2018/015745, dated May 15, 2018, together with the Written Opinion of the International Searching Authority, 9 pages.

Berners-Lee et al., *Uniform Resource Identifier (URI): Generic Syntax*, Network Working Group, Request for Comments 3986, The Internet Society, 61 pages, Jan. 2005.

Bjorklund, *YANG—A Data Modeling Language for the Network Configuration Protocol (NETCONF)*, Internet Engineering Task Force (IETF), Request for Comments 6020, ISSN: 2070-1721, 173 pages, Oct. 2010.

CAIDA, *Observing routing asymmetry in Internet traffic*, (www.caida.org/research/traffic-analysis/asymmetry/1), 7 pages, dated Jul. 17, 2013.

Chiosi, et al, *Network Functions Virtualisation—Introductory White Paper*, Issue 1, at the "SDN and OpenFlow World Congress", Darmstadt-Germany, (http://portal.etsi.org/nfv/nfv_white_paper), 16 pages, dated Oct. 22, 2012.

Cisco Systems, *Parallel Express Forwarding on the Cisco 10000 Series*, (White Paper) Cisco Systems, 4 pages, printed Jun. 17, 2015.

Data Plane Development Kit, *Programmer's Guide*, Release 16.04.0, 216 pages, Apr. 12, 2016.

Davis, *Layer 3 Switches Explained*, Happy Router, 6 pages, dated Aug. 30, 2007.

Filsfils, et al., *Segment Routing Architecture*, Network Working Group, Draft, 28 pages, Oct. 21, 2013.

Hansson, et al., *A Unified Approach to Constrained Mapping and Routing on Network-on-Chip Architectures*, CODES+ISSS '05 Proceedings of the 3rd IEEE/ACM/IFIP International Conference on Hardware/Software Codesign and System Synthesis, 6 pages, Sep. 19-21, 2005.

(56) References Cited

OTHER PUBLICATIONS

Herbert, *xps: Transmit Packet Steering*, Eklektix, Inc., 11 pages, Oct. 26, 2010.
IANA, *Transmission Control Protocol (TCP) Parameters*, (www.iana.org/assignments/tcp-parameters/tcp-parameters.xhtm), 5 pages, dated Sep. 22, 2014.
Katz et al., *Bidirectional Forwarding Detection (BFD)*, Internet Engineering Task Force (IETF), Request for Comments 5880, ISSN: 2070-1721, Juniper Networks, 49 pages, Jun. 2010.
Klement, *1.2 Overview of a TCP communications session*, RPG IV Socket Tutorial (http://www.scottklement.com/rpg/socketut/overview), 2 pages, 2001.
Microsoft, *Introduction to Receive Side Scaling*, Developer Resources, https://msdn.microsoft.com/en-us/library/windows/hardware/ff556942(v=vs.85).aspx, 3 pages, Apr. 2014.
Microsoft, *RSS with a Single Hardware Receive Queue*, Developer Resources, https://msdn.microsoft.com/en-us/library/windows/hardware/ff570727(v=vs.85).aspx, 2 pages, Jan. 2015.
Microsoft, *RSS with Hardware Queuing*, Developer Resources, https://msdn.microsoft.com/en-us/library/windows/hardware/ff570728(v=vs.85).aspx, 2 pages, Jan. 2015.
Microsoft, *Non-RSS Receive Processing*, Developer Resources, https://msdn.microsoft.com/en-us/library/windows/hardware/ff568798(v=vs.85).aspx, 2 pages, Jan. 2015.
PC Magazine Encyclopedia, *Definition of TCP/IP abc's*, PC Magazine Encyclopedia (www.pcmag.com/encyclopedia/term/52615), 5 pages, 2005.
Previdi, et al., *IPv6 Segment Routing Header (SRH)*, Network Working Group, Draft, 24 pages, Jul. 3, 2014.
Roberts, *The Next Generation of IP—Flow Routing*, SSGRR 2003S International Conference, L'Aquila, Italy, 11 pages, Jul. 29, 2003.
Rouse, *What is routing table?* Posted by Margaret Rouse (http://searchnetworking.techtarget.com/definition/routing-table), 5 pages, Apr. 2007.
Shang, et al., *Making Better Use of All Those TCP ACK Packets*, Computer Science Department, Worcester Polytechnic Institute, 10 pages, 2005.
Shaw, *Multi-queue network interfaces with SMP on Linux*, Greenhost, https://greenhost.net/2013/04/10/multi-queue-network-interfaces-with-smp-on-linux/, 5 pages, Apr. 10, 2013.
Sollins, et al., *Functional Requirements for Uniform Resource Names*, Network Working Group, Request for Comments 1737, 7 pages, Dec. 1994.
Srinivasan, et al., *A Technique for Low Energy Mapping and Routing in Network-on-Chip Architectures*, ISLPED '05 Proceedings of the 2005 International Symposium on Low Power Electronics and Design, 6 pages, Aug. 8-10, 2005.
Wikipedia, *LAN switching*, 5 pages, dated Jun. 12, 2013.
Wikipedia, *Management information base*, 6 pages, dated Jul. 15, 2013.
Wikipedia, *Reverse path forwarding*, 3 pages, dated Jul. 31, 2013.
Wikipedia, *Equal-cost multi path routing*, 1 page, dated Sep. 13, 2013.
Wikipedia, *Transmission Control Protocol*, 18 pages, dated Sep. 16, 2013.
Wikipedia, *Software-defined networking*, 6 pages, dated Sep. 16, 2013.
Wikipedia, *Network socket*, 4 pages, dated Sep. 19, 2013.
Wikipedia, *Router (computing)*, 8 pages, dated Sep. 23, 2013.
Wikipedia, *Network address translation*, 11 pages, dated Sep. 24, 2013.
Wikipedia, *Open vSwitch*, 2 pages, dated Nov. 24, 2013.
Wikipedia, *Active queue management*https://en.wikipedia.org/wiki/Active_queue_management, 2 pages, Apr. 22, 2015.
Wikipedia, *Network interface controller*, https://en.wikipedia.org/wiki/Network_interface_controller, 5 pages, May 19, 2015.
International Searching Authority, International Search Report—International Application No. PCT/2015/044815, dated Dec. 6, 2015, together with the Written Opinion of the International Searching Authority, 8 pages.
International Searching Authority, International Search Report—International Application No. PCT/US2015/060840, dated Mar. 8, 2016, together with the Written Opinion of the International Searching Authority, 13 pages.
International Searching Authority, International Search Report—International Application No. PCT/US2016/013416, dated Jun. 8, 2016, together with the Written Opinion of the International Searching Authority, 12 pages.
International Searching Authority, International Search Report—Application No. PCT/US2016/026938, dated Jul. 28, 2016, together with the Written Opinion of the International Searching Authority, 9 pages.

* cited by examiner

METHOD AND APPARATUS FOR MANAGING ROUTING DISRUPTIONS IN A COMPUTER NETWORK

FIELD OF THE INVENTION

The invention generally relates to data routing in a computer network and, more particularly, the invention relates to maintaining communication when routing data in a computer network.

BACKGROUND OF THE INVENTION

Routers transmit data across the Internet using the Internet Protocol ("IP"). As known by those in the art, IP serves as the de-facto standard for forwarding data messages ("datagrams") between network devices connected with the Internet. To that end, IP delivers datagrams across a series of Internet devices, such as routers, in the form of one or more data packets. Each packet has two principal parts: (1) a payload with the information being conveyed (e.g., text, graphic, audio, or video data), and (2) a header, known as an "IP header," having the address of the network device to receive the packet(s) (the "destination device"), the identity of the network device that sent the packet (the "originating device"), and other data for routing the packet.

IP uses transport layer protocols to establish basic transmission paths between two routing nodes. One widely used transport layer protocol, known as "Transmission Control Protocol" ("TCP") aims to ensure reliable communication between two routing nodes. Undesirably, however, network changes or network address translation ("NAT") between two routing nodes using TCP can lead to packet loss, or an abrupt termination of communication between the two routing nodes.

SUMMARY OF VARIOUS EMBODIMENTS

In accordance with one embodiment of the invention, a routing method checks a network path selected for transmitting a stream of packets between a first routing node and a second routing node in a computer network. The stream of packets complies with a first transport protocol and thus, each packet in the stream of packets has a first transport protocol header. The method forwards, from the first routing node toward the second routing node, a set of handshake packets (e.g., one or more packets) in response to the path checking detecting a communication disruption along the network path. The set of handshake packets includes change information indicating a change in the transport protocol for a plurality of the packets in the stream. Before, during or after forwarding the set of handshake packets, the method "protocol modifies" the plurality of packets in the stream ("modified packets"). The modified packets are different from the set of handshake packets. Specifically, the method modifies the first transport protocol header in the plurality of packets in the stream to comply with a second transport protocol header of a second transport protocol. This protocol modification preferably does not increase the packet size of each of modified packets. The method then forwards the modified packets toward the second routing node.

One difference between the modified packets and the set of handshake packets is their sizes—the size of each packet of the set of handshake packets may be greater than the packet size of the modified packets. Among other ways, the method may modify a set of the stream of packets to form the set of handshake packets. To that end, the set of handshake packets may include metadata having the change information.

Some embodiments check the path by forwarding a set of test packets from the first routing node toward the second routing node along the network path. The network path may be considered to have a communication disruption if the first routing node does not receive an acknowledgement message from the second routing node within a prescribed period. The acknowledgement message, if sent, thus has receipt information indicating receipt of the set of test packets from the first routing node. Alternatively, the first routing node may receive an acknowledgement message from the second routing node. In that latter case, the first routing node may be configured to forward, in response to receipt of the acknowledgement message, the plurality of packets in the stream from the first routing node toward the second routing node using the first transport protocol.

Among other ways, the method may protocol modify the packets by moving first header information from a first location in the header of the first transport protocol header to another location in the packet, and writing second header information in the first location. In that case, the second header information complies with the second transport protocol. In a complimentary manner, after the second routing node receives the modified packets, the method may reconstruct the modified packets to include the first transport protocol header. The first transport protocol header preferably has error checking data, while the second protocol header may be free of error checking data.

The stream of packets may be part of a session between the first and second routing nodes. In that case, the method may check by detecting a communication disruption along the network path before transmission of the stream of packets between the first routing node and the second routing node. The method then may protocol modify the plurality of packets in the stream before completing initiating of the session. The stream of packets preferably is part of a stateful session between the first and second routing nodes. As such, the first routing node may maintain state information for the session in memory.

In accordance with another embodiment, a routing device has a path checker that checks a network path for transmitting a stream of packets between a first routing node and a second routing node in a computer network. The stream of packets complies with a first transport protocol and therefore each of those packets has a first transport protocol header. The routing device also has an interface operably coupled with the path checker. The interface is configured to forward, from the first routing node toward the second routing node, a set of handshake packets in response to detection of a communication disruption along the network path by the path checker. The set of handshake packets has change information indicating a change in the transport protocol for a plurality of the packets in the stream.

The routing device also has a packet changer operatively coupled with the path checker and the interface. The packet changer is configured to modify the plurality of packets in the stream ("modified packets") before, during or after forwarding the set of handshake packets. As with the above noted embodiments, the modified packets in the stream are different from the set of handshake packets. Preferably, the packet changer further is configured to modify the first transport protocol header in the plurality of packets in the stream to comply with a second transport protocol header of a second transport protocol. The packet changer also is configured to modify the first transport protocol header without increasing the packet size of each of modified packets. Moreover, the interface is configured to forward the modified packets toward the second routing node.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Illustrative embodiments detect and aim to overcome connection problems with a path to be used to transmit a stream of packets across a network. To that end, to improve the likelihood that the stream reaches its destination device, a routing device utility modifies the transport header of a plurality of the packets in the stream to comply with a different transport protocol that may be more likely to reach the destination device. To minimize bandwidth requirements and potential packet fragmentation overhead, the routing device utility modifies those transport headers without increasing the size of the packets in the stream—a "zero byte add" to the packets.

For example, the routing device utility may detect a problem transmitting a stream of packets across a desired path using the Transport Control Protocol ("TCP"). The routing device utility responsively may modify the transport header of a plurality of the packets in the stream to comply with the User Datagram Protocol ("UDP"), which has less stringent connectivity requirements than those of TCP. That header change is made in a manner that maintains packet size. Accordingly, the packets are more likely to reach the destination device using UDP without increasing packet size. Details of illustrative embodiments are discussed below.

Networks

Illustrative embodiments preferably are implemented on a conventional computer network. Among other things, a network includes at least two nodes and at least one link between the nodes. Nodes can include computing devices (sometimes referred to as hosts or devices) and routers. Computers include personal computers, smart phones, automatic teller machines (ATMs) and many other types of equipment that include processors and network interfaces. Links include wired and wireless connections between pairs of nodes. In addition, nodes and/or links may be implemented completely in software, such as in a virtual machine, a software defined network, and using network function virtualiza lion. Many networks include switches, which are largely transparent for purposes of this discussion. However, some switches also perform routing functions. For the present discussion, such routing switches are considered routers. Routers are described below.

Figure 1:
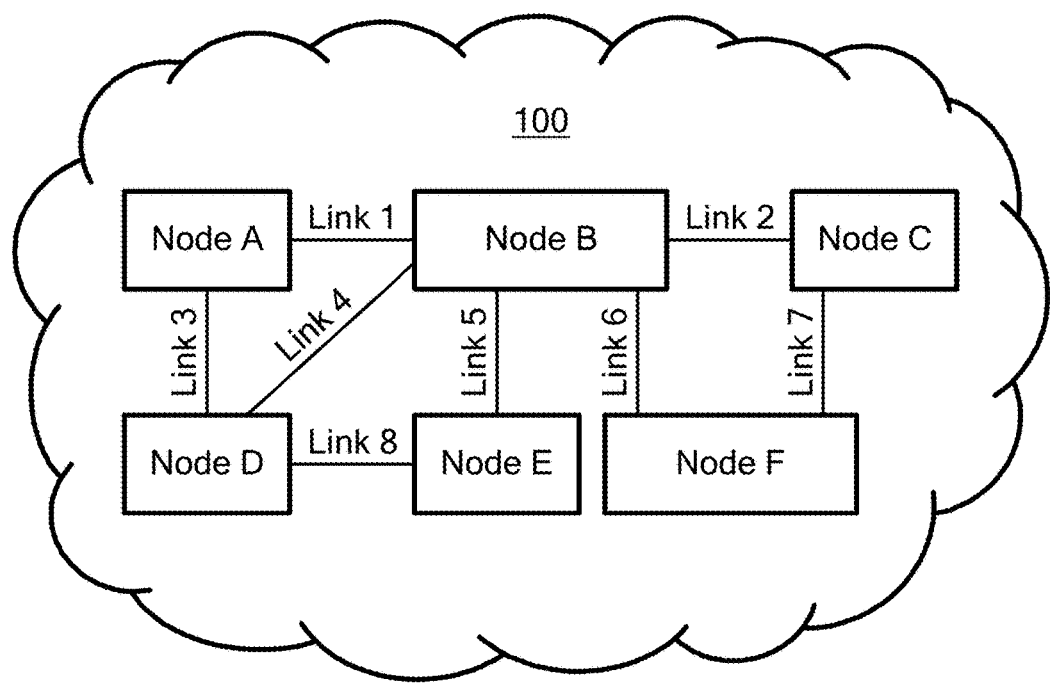
FIG. 1 schematically shows a hypothetical prior art network that may implement illustrative embodiments of the invention.

A node can be directly connected to one or more other nodes, each via a distinct link. For example, FIG. 1 schematically shows a Node A directly connected to Node B via Link 1. In a given network (e.g., within a local area network), each node has a unique network address to facilitate sending and receiving data. A network includes all the nodes addressable within the network according to the network's addressing scheme and all the links that interconnect the nodes for communication according to the network's addressing scheme. For example, in FIG. 1, Node A, Node B, Node C, . . . Node F and all the links 1-8 together make up a network 100. For simplicity, a network is depicted as a cloud or as being enclosed within a cloud.

Nodes initiate communications with other nodes via the network, and nodes receive communications initiated by other nodes via the network. For example, a node may transmit/forward/send data (a message) to a directly connected (adjacent) node by sending the message via the link that interconnects the adjacent nodes. The message includes the network address of the sending node (the "source address") and the network address of the intended receiving node (the "destination address"). A sending node can send a message to a non-adjacent node via one or more other nodes. For example, Node D may send a message to Node F via Node B. Using well known networking protocols, the node(s) between the source and the destination forward the message until the message reaches its destination. Accordingly, to operate properly, network protocols enable nodes to learn or discover network addresses of non-adjacent nodes in their network.

Nodes communicate via networks according to protocols, such as the well-known Internet Protocol (IP) and above noted Transmission Control Protocol (TCP). The protocols are typically implemented by layered software and/or hardware components, such as according to the well-known seven-layer Open System Interconnect (OSI) model. As an example, IP operates at OSI Layer 3 (Network Layer), while the TCP operates largely at OSI Layer 4 (Transport Layer). Each layer performs a logical function and abstracts the layer below it, therefore hiding details of the lower layer.

Figure 2:
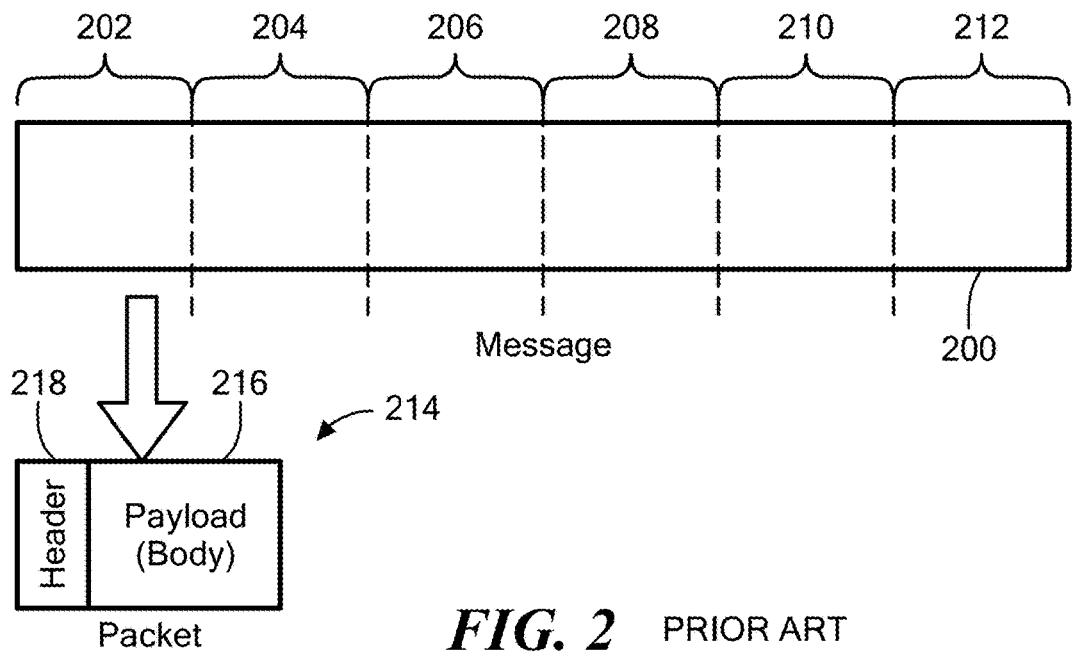
FIG. 2 schematically illustrates a prior art technique for fragmenting a message.

For example, Layer 3 may fragment a large message into smaller packets if Layer 2 (Data Link Layer) cannot handle the message as one transmission. FIG. 2 schematically illustrates a large message 200 divided into several pieces 202, 204, 206, 208, 210 and 212. Each piece 202-212 may then be sent in a separate packet, exemplified by packet 214. Each packet includes a payload (body) portion, exemplified by payload 216, and a header portion, exemplified at 218. The header portion 218 contains information, such as the packet's source address, destination address and packet sequence number, necessary or desirable for: 1) routing the packet to its destination, 2) reassembling the packets of a message, and 3) other functions provided according to the protocol. In some cases, a trailer portion is also appended to the payload, such as to carry a checksum of the payload or of the entire packet. All packets of a message need not be sent along the same path, i.e., through the same nodes, on their way to their common destination. It should be noted that although IP packets are officially called IP datagrams, they are commonly referred to simply as packets.

Some other protocols also fragment data into packets. For example, the well-known TCP protocol fragments data into segments, officially referred to as TCP protocol data units (PDUs). Nevertheless, in common usage, the term packet is used to refer to PDUs and datagrams, as well as Ethernet frames.

Most protocols encapsulate packets of higher layer protocols. For example, IP encapsulates a TCP packet by adding an IP header to the TCP packet to produce an IP packet. Thus, packets sent at a lower layer can be thought of as being made up of packets within packets. Conventionally, a component operating according to a protocol examines or modifies only information within a header and/or trailer that was created by another component, typically within another node, operating according to the same protocol. That is, conventionally, components operating according to a protocol do not examine or modify portions of packets created by other protocols.

In another example of abstraction provided by layered protocols, some layers translate addresses. Some layers include layer-specific addressing schemes. For example, each end of a link is connected to a node via a real (e.g., electronic) or virtual interface, such as an Ethernet interface.

At Layer 2 (Data Link Layer), each interface has an address, such as a media access control (MAC) address. On the other hand, at Layer 3 using IP, each interface, or at least each node, has an IP address. Layer 3 converts IP addresses to MAC addresses.

Figure 3:
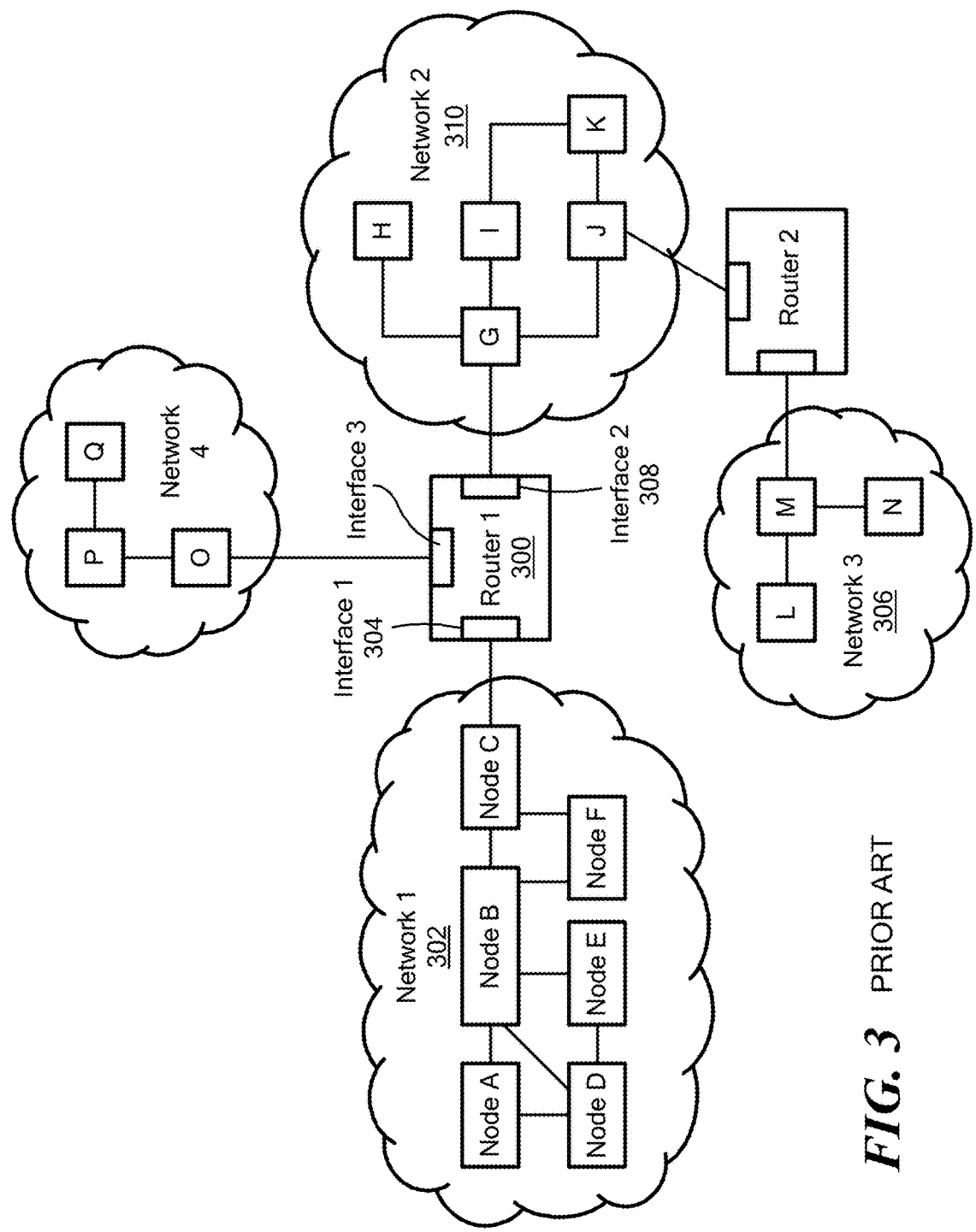
FIG. 3 schematically shows a hypothetical internet that may implement illustrative embodiments of the invention.

A router typically acts as a node that interconnects two or more distinct networks or two or more sub-networks (subnets) of a single network, thereby creating a "network of networks" (i.e., an internet). Thus, a router has at least two interfaces; i.e., one where each interface connects the router to a different network, as exemplified in FIG. 3. When a router receives a packet via one interface from one network, it uses information stored in its routing table to direct the packet to another network via another interface. The routing table thus contains network/next hop associations. These associations tell the router that a particular destination can optimally be reached by sending the packet to a specific router that represents a next hop on the way to the final destination. For example, if Router 1 300 receives a packet, via its Interface 1 304, from Network 1 302, and the packet is destined to a node in Network 3 306, the Router 1 300 consults its router table and then forwards the packet via its Interface 2 308 to Network 2 310. Network 2 310 will then forward the packet to Network 3 306. The next hop association can also be indicated in the routing table as an outgoing (exit) interface to the final destination.

Large organizations, such as large corporations, commercial data centers and telecommunications providers, often employ sets of routers in hierarchies to carry internal traffic. For example, one or more gateway routers may interconnect each organization's network to one or more Internet service providers (ISPs). ISPs also employ routers in hierarchies to carry traffic between their customers' gateways, to interconnect with other ISPs, and to interconnect with core routers in the Internet backbone.

A router is considered a Layer 3 device because its primary forwarding decision is based on the information in the Layer 3 IP packet—specifically the destination IP address. A conventional router does not look into the actual data contents (i.e., the encapsulated payload) that the packet carries. Instead, the router only looks at the Layer 3 addresses to make a forwarding decision, plus optionally other information in the header for hints, such as quality of service (QoS) requirements. Once a packet is forwarded, a conventional router does not retain any historical information about the packet, although the forwarding action may be collected to generate statistical data if the router is so configured.

Illustrative embodiments discussed below relate to an improved apparatus and method for optimizing statistical data generation and collection.

As noted, when a router receives a packet via one interface from one network, the router uses its routing table to direct the packet to another network. Table 1 lists information typically found in a basic IP routing table.

TABLE 1

| | |
|---|---|
| Destination | Partial IP address (Expressed as a bit-mask) or Complete IP address of a packet's final destination |
| Next hop | IP address to which the packet should be forwarded on its way to the final destination |
| Interface | Outgoing network interface to use to forward the packet |
| Cost/Metric | Cost of this path, relative to costs of other possible paths |
| Routes | Information about subnets, including how to reach subnets that are not directly attached to the router, via one or more hops; default routes to use for certain types of traffic or when information is lacking |

Routing tables may be filled in manually, such as by a system administrator, or dynamically by the router. The router uses routing protocols to exchange information with other routers and, thereby, dynamically learns about surrounding network or internet topology. For example, routers announce their presence in the network(s), more specifically, the range of IP addresses to which the routers can forward packets. Neighboring routers update their routing tables with this information and broadcast their ability to forward packets to the network(s) of the first router. This information eventually spreads to more distant routers in a network. Dynamic routing allows a router to respond to changes in a network or internet, such as increased network congestion, new routers joining an internet and router or link failures.

A routing table therefore provides a set of rules for routing packets to their respective destinations. When a packet arrives, a router examines the packet's contents, such as its destination address, and finds the best matching rule in the routing table. The rule essentially tells the router which interface to use to forward the packet and the IP address of a node to which the packet is forwarded on its way to its final destination IP address.

With hop-by-hop routing, each routing table lists, for all reachable destinations, the address of the next node along a path to that destination, i.e., the next hop. Assuming that the routing tables are consistent, a simple algorithm of each router relaying packets to their destinations' respective next hop suffices to deliver packets anywhere in a network. Hop-by-hop is a fundamental characteristic of the IP Internetwork Layer and the OSI Network Layer.

Thus, each router's routing table typically merely contains information sufficient to forward a packet to another router that is "closer" to the packet's destination, without a guarantee of the packet ever being delivered to its destination. In a sense, a packet finds its way to its destination by visiting a series of routers and, at each router, using then-current rules to decide which router to visit next, with the hope that at least most packets ultimately reach their destinations.

Note that the rules may change between two successive hops of a packet or between two successive packets of a message, such as if a router becomes congested or a link fails. Two packets of a message may, therefore, follow different paths and even arrive out of order. In other words, when a packet is sent by a source node, there is no predetermined path the packet will take between the source node and the packet's destination. Instead, the path typically is dynamically determined as the packet traverses the various routers. This may be referred to as "natural routing," i.e., a path is determined dynamically as the packet traverses the internet.

It should be noted that conventionally, packets sent by the destination node back to the source node may follow different paths than the packets from the source node to the destination node.

In many situations, a client computer node establishes a session with a server computer node, and the client and server exchange packets within the session. For example, a client computer executing a browser may establish a session with a web server. The client may send one or more packets to request a web page, and the web server may respond with one or more packets containing contents of the web page. In some types of sessions, this back-and-forth exchange of packets may continue for several cycles. In some types of sessions, packets may be sent asynchronously between the two nodes.

A session has its conventional meaning; namely, it is a plurality of packets sent by one node to another node, where all the packets are related, according to a protocol. A session may be thought of as including a lead (or initial) packet that begins the session, and one or more subsequent packets of the session. A session has a definite beginning and a definite end. For example, a TCP session is initiated by a SYN packet. In some cases, the end may be defined by a prescribed packet or series of packets. For example, a TCP session may be ended with a FIN exchange or an RST. In other cases, the end may be defined by lack of communication between the nodes for at least a predetermined amount of time (a timeout time). For example, a TCP session may be ended after a defined timeout period. Some sessions include only packets sent from one node to the other node. Other sessions include response packets, as in the web client/server interaction example. A session may include any number of cycles of back-and-forth communication, or asynchronous communication, according to the protocol, but all packets of a session are exchanged between the same client/server pair of nodes. A session is also referred to herein as a series of packets.

A computer having a single IP address may provide several services, such as web services, e-mail services and file transfer (FTP) services. Each service is typically assigned a port number in the range 0-65,535 that is unique on the computer. A service is, therefore, defined by a combination of the node's IP address and the service's port number. Note that this combination is unique within the network the computer is connected to, and it is often unique within an internet. Similarly, a single node may execute many clients. Therefore, a client that makes a request to a service is assigned a unique port number on the client's node, so return packets from the service can be uniquely addressed to the client that made the request.

The term socket means an IP address-port number combination. Thus, each service has a network-unique, and often internet-unique, service socket, and a client making a request of a service is assigned a network-unique, and sometimes internet-unique, client socket. In places, the terms source client and destination service are used when referring to a client that sends packets to make requests of a service and the service being requested, respectively.

Mitigating Path Disruptions

Figure 4:
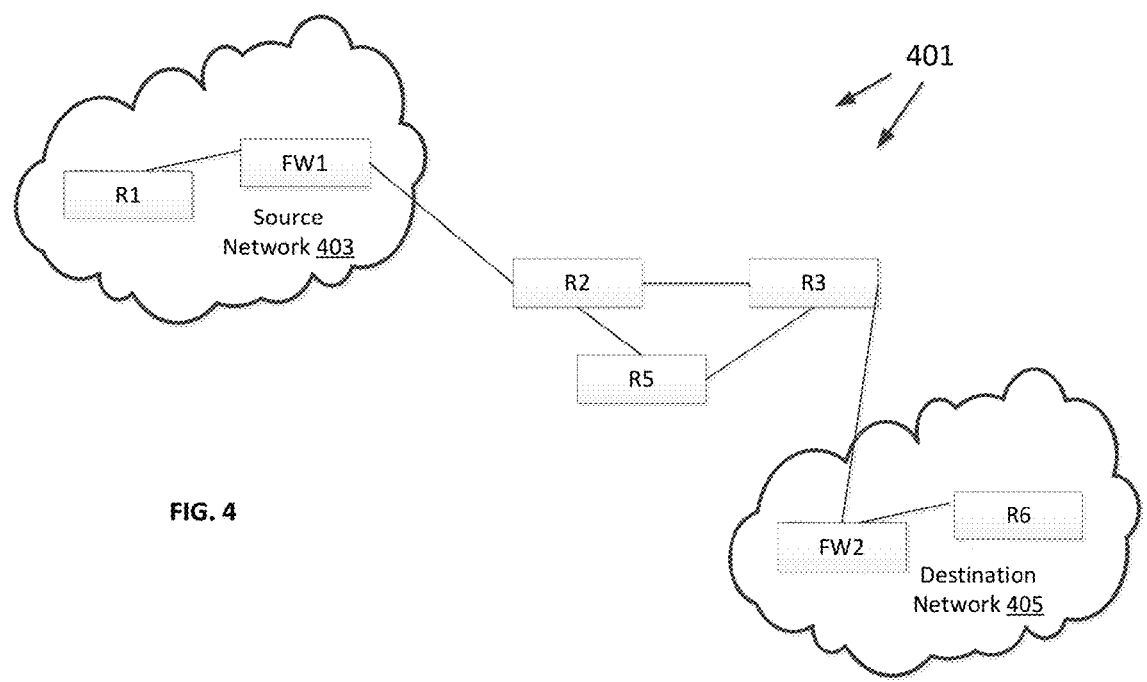
FIG. 4 schematically shows an example of a specific network implementing illustrative embodiments of the invention.

As noted above, illustrative embodiments detect and aim to resolve connectivity problems with a path to be used by a stream of packets across a network. FIG. 4 schematically shows an example of a specific network 401 that may use illustrative embodiments of the invention to forward a stream of packets to a destination. Specifically, in this example, the network 401 includes a source network 403 coupled with a destination network 405 through three routers R2, R3, and R5. The source network 403 has a router R1 and is protected by a firewall FW1 at its edge. In a corresponding manner, the destination network 405 also has a router R6 and is protected by a firewall FW2 at its edge. The firewalls FW1 and FW2 may be stateful firewalls, which can present certain challenges discussed below.

Indeed, network 401 is significantly simplified and thus, additional nodes and devices may be in the network 401. For example, the source and destination networks 403 and 405 may have servers and other computing devices. Also, the routers R1 and R6 on the source and destination networks 403 and 405 often are not the final destinations that consume the stream. For example, a web server or other device and the destination network 405 may consume the packets in the stream, and/or responsively transmit return packets back to the other network 402 or 404.

The source network 403 may communicate with the destination network 405 via routers R2, R3 and R5 using two different paths. Specifically, the first path may be formed by links through routers R2 and R3. The second path may be formed by links through routers R2, R5, and R3. Problems may arise in response any of a variety of issues, such as a potential or actual communication disruption in the network 401. For example, problems may arise when one of the links fails (e.g., the link between routers R2 and R3). Thus, if the destination network 405 is to receive the remainder of the packets in the session, the router R1 or other device must establish a new path to the destination network 405. In this example, that new path may be the above noted second path, which passes through router R5.

The inventors discovered that conventional firewalls, such as one of the firewalls F1 or F2, often create communication disruptions by not accepting packets after a mid-stream path change in a given session. This can cause packets to drop, loss of data, and other transmission problems.

Illustrative embodiments aim to solve this problem by detecting communication disruptions along the network path either before or during the session, and then modifying the transport protocol headers of packets in a manner that enables them to continue to the destination network 405 regardless of the change in the network path. These communication disruptions may be actual disruptions, such as the firewall FW2 at the destination network 405 (or another firewall along the path) preventing the stream of packets from accessing its local network after a midstream routing change. When the firewall FW2 prevents access to the destination network 405, conventionally (when using certain transport protocols) it requires a full handshake process to re-initiate the entire data transmission process. Illustrative embodiments do not require a full handshake process—thus favorably enabling the stream to continue transmission to the destination network 405.

In a similar manner, these communication disruptions may be potential disruptions. Specifically, while setting up the communication path, a routing device utility (discussed below) may detect that that the firewall FW2 at the destination network 405 or along the path will not accept a stream of packets from accessing its local network after a mid-stream routing change. Accordingly, illustrative embodiments check for one or both of these types of nodal disruptions, and take appropriate action.

Figure 5:
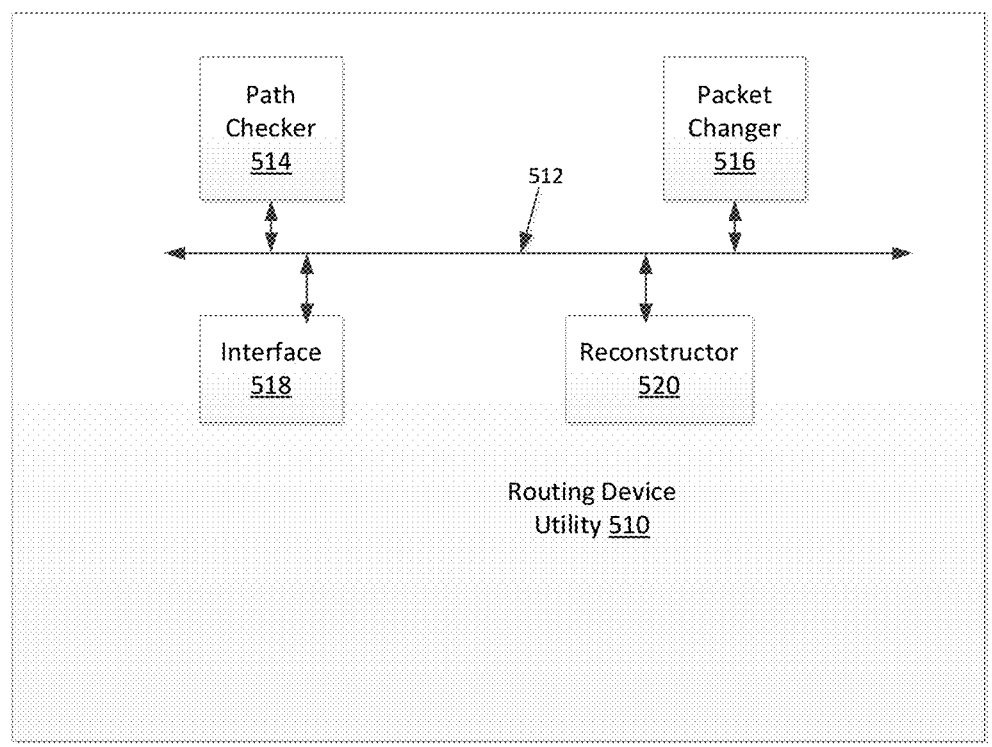
FIG. 5 schematically shows a block diagram of a routing device utility implementing illustrative embodiments of the invention.

To that end, FIG. 5 schematically shows a block diagram of a routing device utility 510 implementing illustrative embodiments of the invention. Among other things, this utility 500 may be a standalone actual or virtual device, or may be integrated into a router. For example, the utility may be integrated into the same chassis as the router R6 at the destination network 405 as a virtual or actual device. As another example, the utility may be a standalone device at the destination network 405. Preferably, for bi-directional routing, the routing device utility 510 is distributed—logically located at both the source and destination networks 403 and 405, as well as at other networks between the source and destination networks 403 and 405. Those skilled in the art can select the appropriate topology for deploying the utility.

FIG. 5 schematically shows four components in the routing device. Each of these components is operatively connected by a conventional interconnect mechanism. FIG. 5 simply shows a bus 512 communicating each the components. Those skilled in the art should understand that this generalized representation can be modified to include other conventional direct or indirect connections. Accordingly, discussion of the bus 512 is not intended to limit various embodiments.

The components include a path checker 514 configured to check a network path for the above noted disruptions, and a packet changer 516 configured to modify packets in a stream depending upon the findings of the path checker 514. For example, if the path checker 514 detects disruptions (e.g., the firewall FW2 will not accept mid-stream packets), then the packet changer 516 will modify the packets in the stream to overcome the detected disruption. As discussed in greater detail below, the packet changer 516 first may modify an initial set of one or more packets in the stream to act as "handshake packets" to initiate a change in the transport protocol, and before, during and/or after forming the handshake packets, modify the transport header in the remaining packets without increasing their overall sizes. An interface 518 operatively coupled with the path checker 514 and packet changer 516 forwards the various modified packets onto the network path toward the destination network 405. The interface 518 also may send and receive other information to/from the routing device utility 510. Each of these components cooperate to mitigate the likelihood that a network path will drop packets in certain discussed circumstances.

The routing device utility 510 also has a packet reconstructor 520 configured to reconstruct packets to their original transport protocol. For example, as discussed in greater detail below, the packet reconstructor 520 may be configured to convert received packets from the UDP protocol to TCP protocol.

Indeed, it should be noted that FIG. 5 only schematically shows each of these components. Those skilled in the art should understand that each of these components can be implemented in a variety of conventional manners, such as by using hardware, software, or a combination of hardware and software, across one or more other functional components. For example, the packet changer 516 may be implemented using a plurality of microprocessors executing firmware. As another example, the packet changer 516 may be implemented using one or more application specific integrated circuits (i.e., "ASICs") and related software, or a combination of ASICs, discrete electronic components (e.g., transistors), and microprocessors. Accordingly, the representation of the packet changer 516 and other components in a single box of FIG. 5 is for simplicity purposes only. In fact, in some embodiments, the packet changer 516 of FIG. 5 is distributed across a plurality of different devices—not necessarily within the same housing or chassis.

It should be reiterated that the representation of FIG. 5 is a significantly simplified representation of an actual routing device utility 510. Those skilled in the art should understand that such a device may have many other physical and functional components, such as central processing units, other packet processing modules, and short-term memory. Accordingly, this discussion is in no way intended to suggest that FIG. 5 represents all of the elements of the ultimately deployed routing device utility 510.

Figure 6:
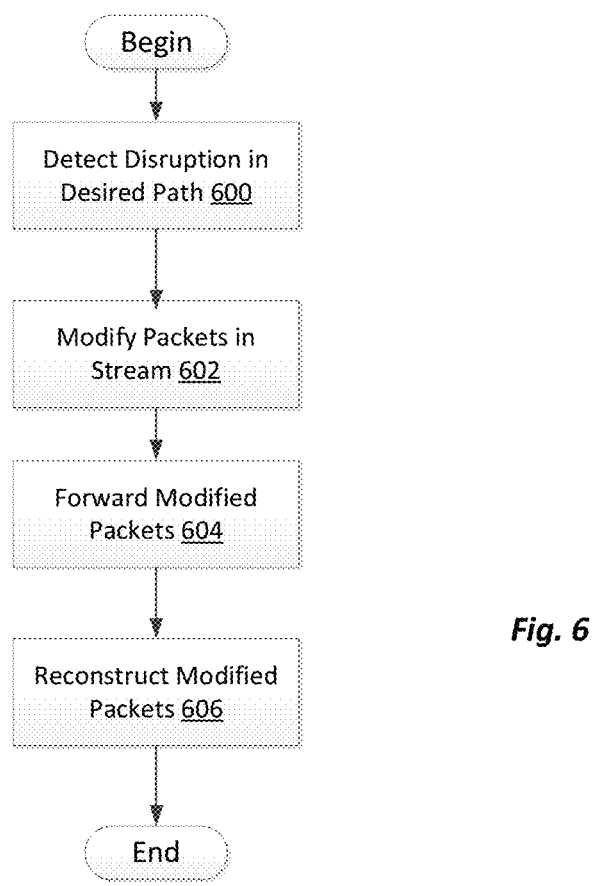
FIG. 6 shows a method of routing packets using a transport header modification technique in accordance with illustrative embodiments of the invention.

FIG. 6 shows a method of routing packets using a transport header modification technique to improve transmission reliability in accordance with illustrative embodiments of the invention. It should be noted that this method is substantially simplified from a longer process that normally would be used to route packets using the noted transport header modification technique. Accordingly, the method of FIG. 6 may have many other steps that those skilled in the art likely would use. In addition, some of the steps may be performed in a different order than that shown, or at the same time. Those skilled in the art therefore can modify the process as appropriate. Moreover, although the process of FIG. 6 is discussed as transmitting packets from the source network 403 to the destination network 405, those skilled in the art should understand that this process applies to bidirectional communication between the two networks 403 and 405.

The process begins at step 600, in which the path checker 514 detects an actual or potential disruption in the desired path between the source router R1 and the destination router R6. For example, as noted above, one of the firewalls FW1 or FW2 may be configured not to accept certain packets after a mid-stream path change in a given session. Such a firewall configuration is deemed to be a disruption (a "path change disruption") in the network path between the two routers R1 and R6. In a similar manner, some other firewall or other intermediate device in the overall network also may be configured not to accept certain packets after midstream change in a given session. Accordingly, discussion of the destination firewalls FW1 and FW2 in this manner are for illustrative purposes only.

Figure 7A:
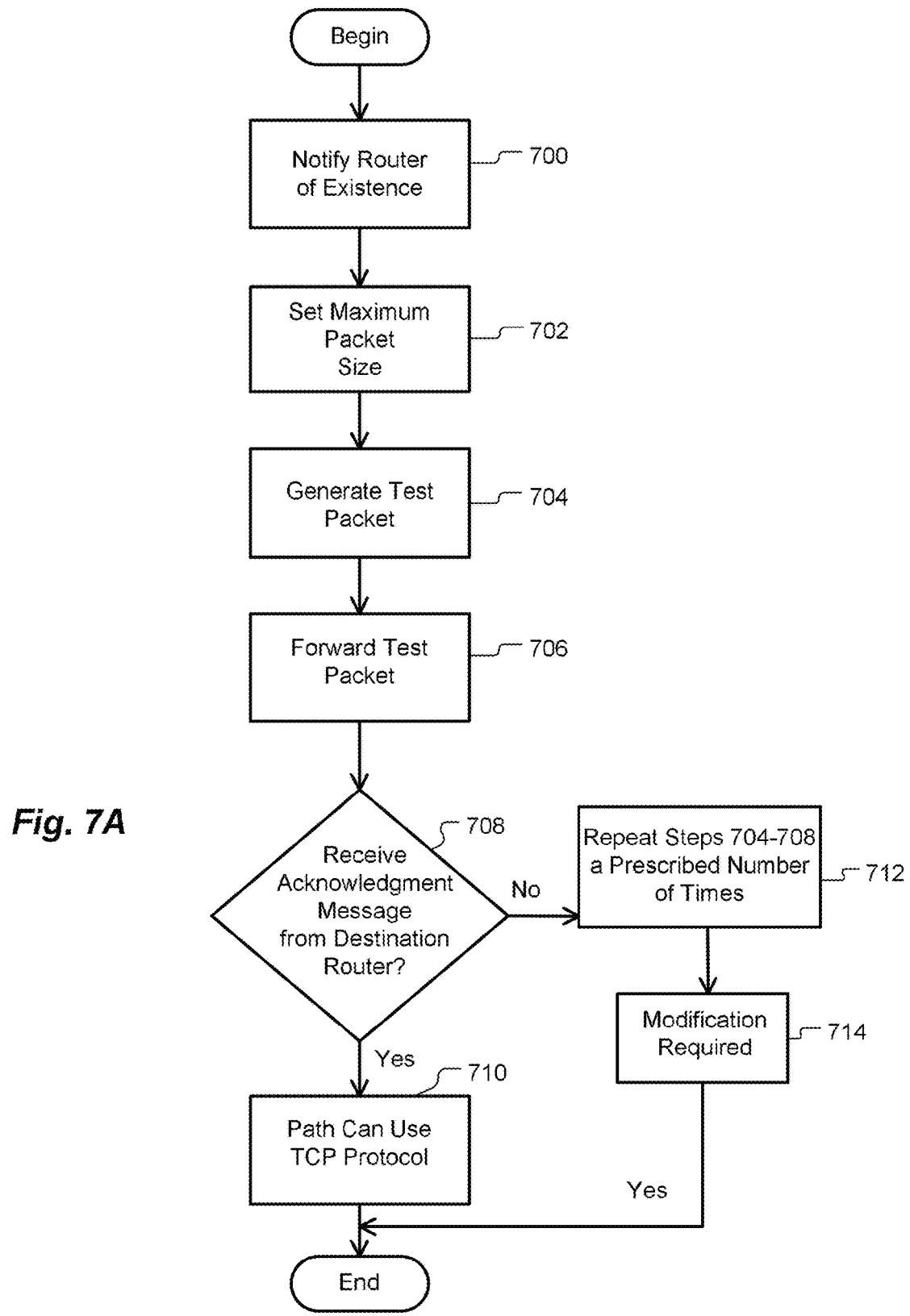
FIG. 7A shows a method of detecting communication problems between two network nodes in accordance with illustrative embodiments of the invention.

In illustrative embodiments, the path checker 514 repeatedly checks for a disruption at some prescribed interval. For example, the path checker 514 may check for disruptions between the two routers R1 and R6 multiple times every second. Preferably, the path checker 514 begins checking for disruptions before the session between the two routers R1 and R6 is initiated, and continues checking the path during the session (i.e., after the session is initiated). Some alternative embodiments, however, may check for disruptions only at initiation or only after initiation. FIG. 7A, discussed in detail below, describes one way that the path checker 514 determines if there is a disruption between the two routers R1 and R6.

After detecting a disruption in the desired path, the process continues to step 602, in which the packet changer 516 modifies the packets in the stream from the source router R1 to the destination router R6. As discussed in greater detail below with regard to FIG. 7B, the packet changer 516 changes the transport protocol header to comply with a different transport protocol that can overcome the configuration problems in the firewall FW2. For example, the second transport protocol may not have error checking functionality (e.g., UDP), while the first transport protocol may have error checking functionality (e.g., TCP). Also as noted above and discussed in detail below, other than a small set of initial handshake packets, the transport protocol headers favorably are modified in a manner that does not increase the size of the packets in the stream.

Next, the process continues to step 604, in which the interface 518 forwards the modified packets to the destination router R6. Upon receipt, the packet reconstructor 520 at the destination router R6 reconstructs the modified packets to comply with their original transport protocol (step 606). For example, received UDP protocol packets that originally were TCP packets may be converted back to the TCP protocol. At that point, the converted stream may be forwarded to a local device that consumes the packets, such as a local server (not shown) in the destination network 405.

Figure 7B:
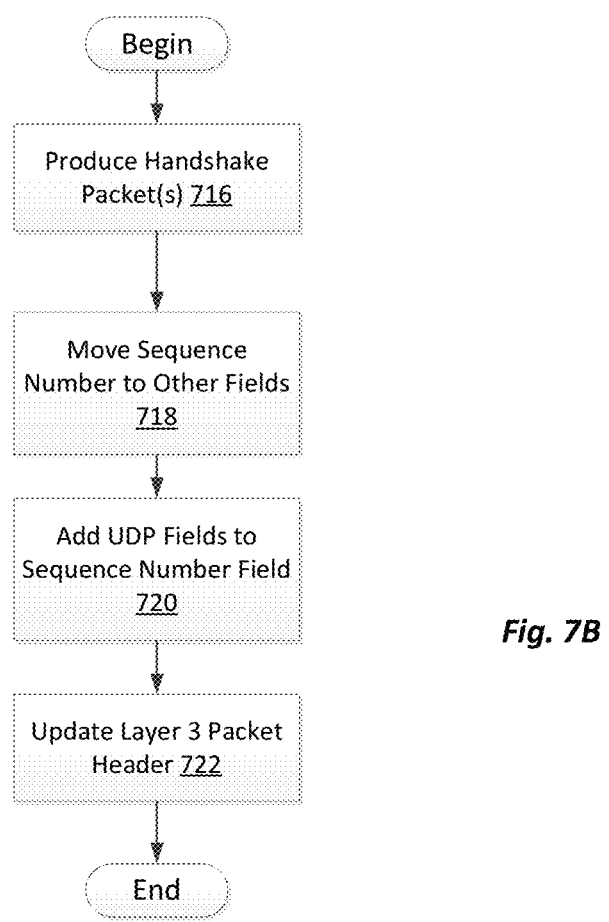
FIG. 7B shows a method of modifying the transport header of a stream of packets in accordance with illustrative embodiments of the invention.
Figure 8:
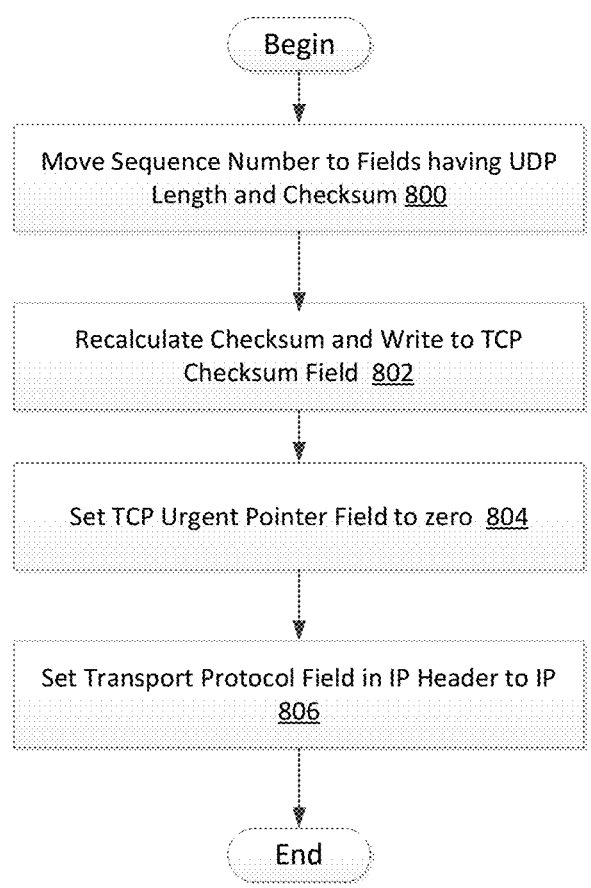
FIG. 8 shows a method of reconstructing modified packets in accordance with illustrative embodiments of the invention.

Those skilled in the art may implement various steps of FIG. 6 using any of a variety of techniques. FIGS. 7A, 7B and 8 show three illustrative methods for implementing specific steps of FIG. 6. Like the process of FIG. 6, the methods of FIGS. 7A, 7B, and 8 are substantially simplified from longer processes that likely would be used for their respective processes. Accordingly, the methods of FIGS. 7A, 7B, and 8 may have many other steps that those skilled in the art likely would use. In addition, some of the steps may be performed in a different order than that shown, or at the same time. Those skilled in the art therefore can modify the process as appropriate.

FIG. 7A shows a process that the source router R1 and the path checker 514 uses to check the network path between the source network 403 and the destination network 405 (as discussed above at step 600 of FIG. 6). If the session is not initiated, the source router R1 begins the initiation/handshake process with destination router R6. To that end, the source router R1 notifies the destination router R6 of its existence (step 700). This may involve transmitting conventional handshake packets between the routers R1 and R6 to initiate the session. Of course, if the session is ongoing, then this step may be skipped.

At step 702, the routers R1 and R6 set the maximum packet size for the stream between the source network 403 and the destination network 405. In a manner similar to step 700, as an initial step to initiate the session, this step will be skipped if the session is ongoing. This step may be completed by the two routers R1 and R6 communicating in a conventional manner via a standard channel of the bidirectional forwarding detection (BFD) network protocol. For example, the two routers R1 and R6 may set the maximum transmission unit (MTU) of the packets in the stream to be no greater than some conventional amount, such as 1500 bytes. Accordingly, as known by those skilled in the art, a packet greater than 1500 bytes to be transmitted by the source router R1 necessarily must be segmented into one or more smaller packets that do not exceed maximum MTU packet size.

The path checker 514 then initiates the process of determining if the path has disruptions (step 704). Specifically, as noted above, one of those disruptions may include a network device that cannot accept certain packets rerouted as a result of a midstream routing change. Specifically, such a network device may require a full set of handshake packets, such as those required using the TCP/IP protocols, to receive packets. As noted above, those network devices may include a firewall FW2 at the destination network 405, as well as one or more firewalls somewhere in the overall network 401 between the source and destination networks 403 and 405.

To that end, the path checker 514 generates a test packet. In summary, if the destination router R6 receives this test packet, it will produce an acknowledgment packet that it forwards to the sending router R1. Receipt of this acknowledgment packet indicates no disruption in the path, while lack of receipt of this acknowledgment packet indicates some kind of disruption in the path.

To those ends, the test packet may be formatted to comply with a preferred protocol (e.g., the TCP protocol) and resemble a midstream packet from a session. Illustrative embodiments generate this test packet to be larger than the MTU maximum size (e.g., greater than 1500 bytes), although it also can be smaller. Accordingly, the sending router R1 segments the single test packet into two or more TCP packets with substantially identical TCP headers.

Next, the source router R1 forwards the test packet (s) toward the destination router R6 (step 706). At this point, the routing device utility 510 is in a waiting mode to determine if it detects the above noted acknowledgment message from the destination router R6. Illustrative embodiments may require the routing device utility 510 to wait a prescribed amount of time for the acknowledgment message. In other embodiments, the routing device utility 510 may remain in the waiting mode for a period of time defined by some other means.

If the path checker 514 receives the acknowledgment message within this prescribed period, the process continues to step 710, in which the path is considered usable with the existing transport protocol, i.e., it is not disrupted. In this case, the path may be used with the TCP protocol. Accordingly, there is no need to change the transport protocol header of the packets in the stream.

If, however, the routing device utility 510 does not receive an acknowledgment message within the prescribed time, then the process repeats steps 704-708 a prescribed number of times. Of course, if, during one of those repeated cycles of step 704 through 708, the router R1 receives the acknowledgment message, then the process concludes through step 710. Conversely, if after the prescribed number of times the receiving router R1 does not receive the acknowledgment message, then the process continues to step 714, in which the path checker 514 commands the packet changer 516 to modify the packet headers as described above with regard to FIG. 6.

FIG. 7B schematically shows details of how the packet changer 516 modifies the TCP packets in the stream in accordance with illustrative embodiments of the invention (e.g., as discussed above at step 602 of FIG. 6). The process begins at step 716, in which the packet changer 516 produces a set of one or more handshake packets. This set of handshake packets is unlike the handshake packets specified by TCP/IP. Specifically, in illustrative embodiments, the packet changer 516 changes a first packet in the stream of packets to include change information indicating that the remaining packets in the stream have been modified. This first packet (or first set of packets) may be a first packet in the stream, or a later-stream packet if the process is executing a mid-stream path change. As discussed in greater detail below, the change information in this handshake packet serves as a notification to the receiving router R6 that it should take appropriate action upon receipt, such as translating such packets back to their original transport protocol.

This change information can be positioned in any of a variety of locations within the set of handshake packets. In preferred embodiments, the change information is positioned in the metadata section of the packet. Specifically, the metadata is positioned between the TCP header and the payload of the packet. Accordingly, this additional metadata increases the size of this set of handshake packets. Despite this, illustrative embodiments do not increase the packet size of most or all of the subsequent packets in the stream.

Before, after, and/or while forming the handshake packet(s), the packet changer 516 begins moving information around the TCP header of each of the succeeding packets in the session to comply with another protocol, such as UDP. As such, unlike the above noted set of handshake packet(s) of step 716, these packets may be referred to as "modified packets." Accordingly, this modified TCP header may operate in compliance with the UDP protocol. Those skilled in the art can select any of a variety of different ways to alter the TCP header. Details of a TCP header are discussed below with regard to FIG. 12. Those skilled in the art nevertheless should know the format of both a TCP header and a UDP header.

To those ends, the packet changer 516 writes, at step 718, the TCP sequence number into the location of the TCP checksum and TCP urgent pointer of the TCP header for later use in reconstructing the TCP header (discussed below with regard to FIG. 8). The packet changer 516 then writes the UDP header length and checksum into the original location of the sequence number and the TCP header (step 720). At this point, the TCP header is configured to comply with the UDP protocol. Importantly, despite these changes, the overall size of the packet remains the same.

Accordingly, these modified packets now can be forwarded between the source router R1 and the destination router R6 using the UDP protocol. The process concludes at step 722, which modifies the Layer 3/IP header to indicate that the transport protocol now is UDP. Details of the Layer 3/IP header are discussed below with regard to FIG. 11.

It should be noted that discussion of TCP and UDP are illustrative and thus, not intended to limit various embodiments to such transport protocols. Those skilled in the art can apply principles of various embodiments to other transport protocols.

FIG. 8 shows a method of reconstructing the modified packets in accordance with illustrative embodiments of the invention (as in step 606 of FIG. 6). The packet reconstructor 520 is at the receiving router R6, although both routers R1 and R6 preferably include it for bi-directional routing. In illustrative embodiments, the packet reconstructor 520 is activated to reconstruct the packets after the routing device utility 510 receives and reads the above noted metadata in the handshake packet(s)—i.e., the metadata indicating that this session or series of packets should be transformed back to the TCP protocol. The method begins at step 800, in which the packet reconstructor 520 moves the TCP sequence number to the field currently having the UDP length and UDP checksum data. Next, the packet reconstructor 520 recalculates the TCP checksum and writes it to the checksum field (step 802), and sets the TCP urgent pointer field to zero (step 804). The process concludes by setting the transport protocol in the Layer 3/IP header to the TCP protocol. Accordingly, the network node ultimately using these packets (e.g., a web server) now will be able to consume the stream using the TCP protocol. That ultimate consuming device therefore does not need to have any prior knowledge of this process that detects and transforms the packets to comply with a different transport protocol. Accordingly, using the techniques described above, illustrative embodiments can change the route of a session in the middle of a session without having to restart the session. For example, during the session, a link between the source router R1 and destination router R6 may malfunction. Rather than restarting the session because the firewall FW2 or some intermediate node cannot accept a change in a TCP stream, the routing device utility 510 simply may detect that such a disruption as possible and change the transport protocol, avoiding the need to restart and repeat the initial TCP/IP handshake processes. Importantly, other than the initial handshake packets noted in step 716 of FIG. 7B, this optimization does not increase the size of the vast majority of the packets in a typical stream.

In addition to implementing the functionality of FIG. 6 and the source router R1 and the receiving router R6, illustrative embodiments also may implement this functionality on routers between the source and destination networks 403 and 405. Accordingly, discussion of this functionality between the source and destination networks 403 and 405 is for illustrative purposes only.

Stateful Routing

In some embodiments, the packets of a session follow the same path as the lead packet of that session, at least in the forward direction, i.e., from a source client to a destination service. The subsequent packets traverse at least a subset of the routers the lead packet traverses between the source client and the destination service. Among other benefits, this stateful routing scheme more effectively enhances the benefits of collecting routing statistics. Those skilled in the art may implement such a stateful routing scheme with the functionality of the routing device utility 510.

Each router in the subset is referred to herein as an intermediate node or waypoint, although the waypoints are not necessarily predetermined before the lead packet is sent by the source client. The lead packet may be naturally routed, or routed by a pre-specified path. It should be noted that although the discussion below describes use of natural routing, it should not limit various embodiments to such a scheme. If the path is not pre-specified, then the path taken by the lead packet establishes the waypoints. In either case, the subsequent packets traverse the same waypoints, and in the same order, as the lead packet.

Of course, some packets may be dropped along the way, as is typical in an IP network or internet, such as by an overloaded router or due to corruption of the packet by a link. Thus, all the packets sent by the source client need not reach the session's destination service and, consequently, all the packets sent by the source client need not traverse all the waypoints. However, subsequent packets that do reach the destination service must traverse all the waypoints. For simplicity of explanation, dropped packets are ignored in the remaining discussion, and the term "all the packets" means all the packets that reach their respective destinations.

As a result of this forward flow control, metrics collected at one of the waypoints represent all the packets of the session. These metrics are not diluted by packets that bypass the waypoint, because no packet of the session can bypass any waypoint. Security functions, such as inspection for malicious packets, performed at one waypoint are sure to be performed on all packets of the session. Importantly, this enables statistics to be calculated for specific sessions.

Some embodiments also ensure that return packets from the destination service to the source client also follow the same path, i.e., traverse the waypoints, but in reverse order. This reverse flow control enables use of paths, such as via proprietary networks, that might not otherwise be available by naturally routing the return packets.

Figure 9:
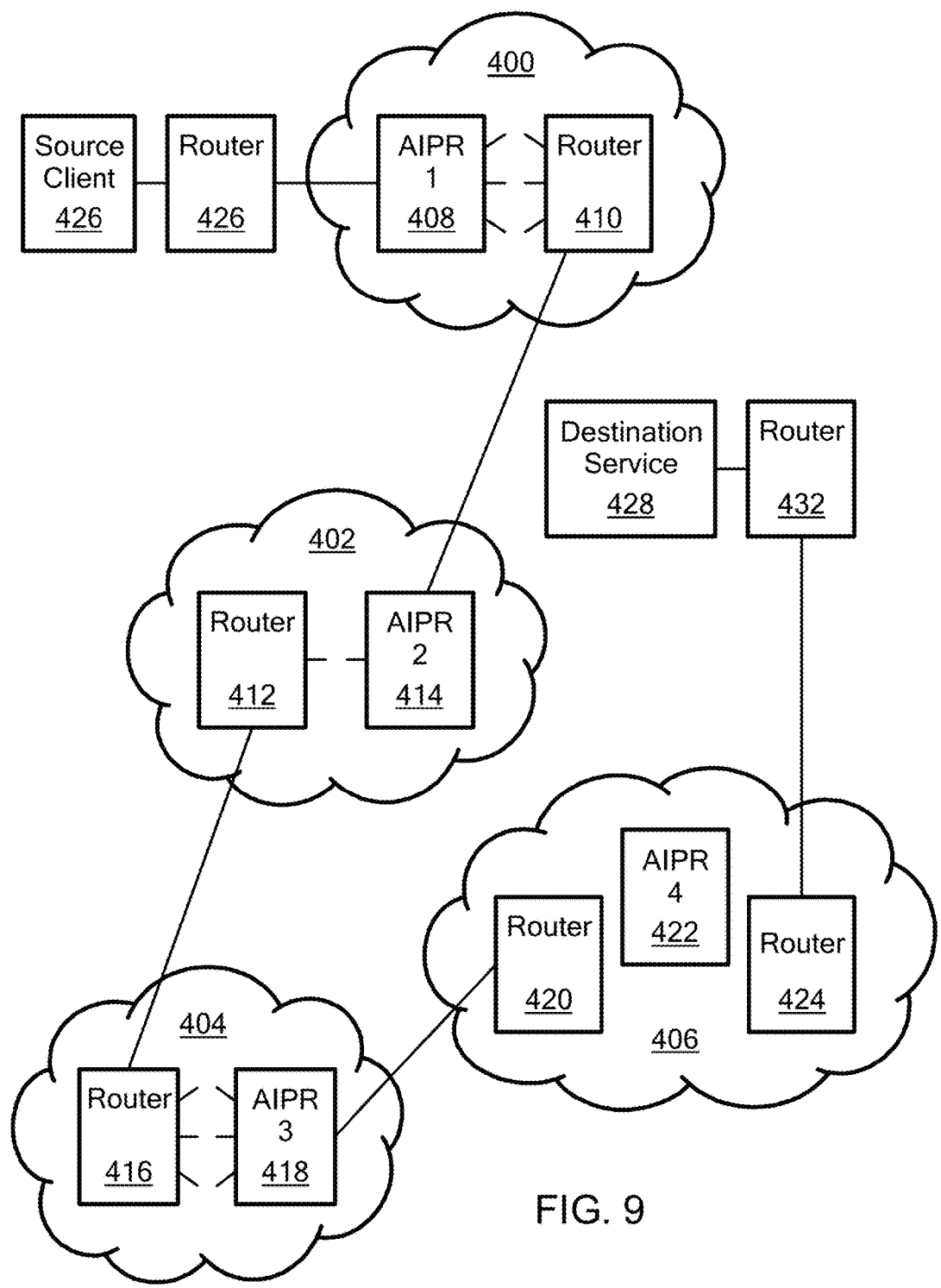
FIG. 9 schematically shows a hypothetical internet that includes a conventional routers and augmented IP routers (AIPRs), according to an embodiment of the present invention.

A packet flow controller (also referred to herein as an augmented IP router ("AIPR")) ensures that subsequent packets of a session follow the same path as the lead packet of the session, as discussed above. In fact, one or both of the routers R1 and R6 of FIG. 5 may be implemented as AIPRs/waypoints. An AIPR also performs conventional routing functions, and also those described above with regard to statistics collection. FIG. 9 is a schematic diagram illustrating a hypothetical set of interconnected networks 400, 402, 404 and 406, i.e., an internet. Each network 401-406 includes a number of routers and AIPRs, not all of which are necessarily shown. Network 401 includes AIPR1 408 and router 410. Network 401 may be, for example, a network of a telecommunications carrier. Network 402 includes a router 412 and AIPR 2 414. Network 402 may be, for example, a network of a first ISP. Network 404 includes a router 416 and AIPR 3 418. Network 404 may be, for example, the Internet backbone or a portion thereof. Network 406 includes a router 420, AIPR 4 422 and another router 424. Network 406 may be, for example, a network of a second ISP.

Assume a source client node 426 initiates a session with a destination service node 428. For example, the source client 426 may request a web page, and the destination service node 428 may include a web server. The source client 426 may, for example, be part of a first local area network (LAN) (not shown) within a first corporation, and the LAN may be connected to the telecommunications carrier network 401 via a gateway router 430 operated by the corporation. Similarly, the destination service node 428 may be operated by a second corporation, and it may be part of a second LAN (not shown) coupled to the network 406 of the second ISP via a gateway router 432 operated by the second corporation. As a lead packet of the session traverses the internet, each AIPR (waypoint) the packet traverses records information that eventually enables the waypoint to be able to identify its immediately previous waypoint and its immediately next waypoint, with respect to the session.

The lead packet of the session is naturally routed. Assume the lead packet reaches AIPR 1 408 before it reaches network 402, 404 or 406. AIPR 1 408 automatically identifies the lead packet as being an initial packet of the session. AIPR 1 408 may use various techniques to identify the beginning of a session, as noted above and as discussed in more detail below. AIPR 1 408 becomes the first waypoint along a path the lead packet eventually follows.

AIPR 1 408 assigns a unique identifier to the session and stores information about the session in the AIPR's database to enable the AIPR 1 408 to identify subsequent packets of the session. In some embodiments, AIPR 1 408 reads the client socket/service socket number pair in the lead packet and stores the client socket/service socket number pair in a database to uniquely identify the session. This enables the AIPR 1 408 to identify the subsequent packets as being part of the session, because all subsequent packets of the session will contain the same client socket/service socket number pair.

In some embodiments, AIPR 1 408 sets a flag in its database to indicate the lead packet has not traversed any other AIPR before reaching AIPR 1 408. This flag may be used later, for example when the AIPR 1 408 handles return packets. AIPR 1 408 may be able to identify the lead packet as not having traversed any other AIPR by lack of any modification to the packet. Packet modification is described below.

AIPR 1 408 modifies the lead packet to indicate the lead packet has been handled by an AIPR. In some embodiments, the AIPR 1 408 stores the unique identifier of the session and, if not included in the unique identifier, the AIPR's network address in the packet to produce a modified lead packet. Subsequent AIPRs, if any, that handle the (now modified) lead packet use this modification to identify the lead packet as a lead packet that has been handled by an AIPR, and to indicate that subsequent packets of the session should be routed the same way as the lead packet is routed.

In some embodiments, AIPR 1 408 assigns a port number on the interface over which AIPR 1 408 will forward the lead packet. The AIPR's network address and this port number, in combination, may be used as a unique identifier of the session, at least from the point of view of the next AIPR along the path. AIPR 1 408 may include the AIPR's network address-port number combination in the modified lead packet. Thus, the next AIPR along the path may assume that subsequent packets sent from this network address-port number combination are part of, or likely to be part of, the session.

AIPR 1 408 then forwards the lead packet naturally. The lead packet traverses an unspecified number of nodes of network 401 until it reaches router 410, which naturally routes the lead packet to network 402. Assume the router 410 forwards the lead packet to AIPR 2 414 in network 402.

AIPR 2 414 detects the modification to the lead packet, identifying a need for special treatment. AIPR 2 414 becomes the second waypoint along the path the lead packet will follow. AIPR 2 414 stores in its database the network address of AIPR 1 408 and the port number assigned by AIPR 1 408, in association with a unique identifier of the session, such as the client and server socket number pair, thus identifying the previous waypoint along the path in association with the session. In this way, each waypoint learns the network address and port number of the previous waypoint along this session's path and uses a related association device (an "associator") to associate this information with a session identifier. This information may be used later to forward return packets, from waypoint to waypoint, back to the source client 426.

In some embodiments, AIPR 2 414 assigns a port number on the interface over which the lead packet was received. The AIPR's network address and this port number, in combination, may be used as a unique identifier of the session, at least from the point of view of AIPR 1 408. Thus, subsequent packets addressed to this network address-port number combination may be assumed to be, or at least are likely to be, part of the session.

In some embodiments, AIPR 2 414 sends a packet back to AIPR 1 408 to inform AIPR 1 408 of the network address-port number combination, in association with the identification of the session. In some embodiments, the network address-port number combination are sent to AIPR 1 408 later, in connection with a return packet, as described below. In either case, AIPR 1 408 learns a network address-port number combination unique to the session, and AIPR 1 408 sends subsequent packets to that address-port combination, rather than naturally forwarding the subsequent packets. In this way, each waypoint learns the network address and port number of the next waypoint along this session's path. This information is used to forward subsequent packets, from waypoint to waypoint, forward to the destination service 428, along the same path as the lead packet.

AIPR 2 214 modifies the lead packet to include the network address of AIPR 2 214, and then forwards the lead packet naturally. As with AIPR 1 408, in some embodiments AIPR 2 214 assigns a port number on the interface over which AIPR 2 214 forwards the packet, and the network address of AIPR 2 214 and the port number are included in the modified lead packet AIPR 2 214 sends.

The lead packet traverses an unspecified number of nodes of network 402, until it reaches router 412, which naturally routes the lead packet to network 404. Assume the router 416 forwards the lead packet to AIPR 3 418.

AIPR 3 418 becomes the third waypoint along the path the lead packet will follow. AIPR 3 418 operates much as AIPR 2 414. The lead packet is then forwarded to network 406, where it traverses AIPR 4 422, which becomes the fourth waypoint.

Three scenarios are possible with respect to the last AIPR 422 (AIPR 4) along the path to the destination service 428.

In the first scenario, one or more AIPRs relatively close to a destination service are provisioned to handle lead packets for the destination service. The AIPRs may be so provisioned by storing information in their databases to identify the destination service, such as by the service socket number or other unique identifier of the service. These "terminus" AIPRs broadcast their ability to forward packets to the destination service. A terminus AIPR is an AIPR that can forward packets to a destination service, without the packets traversing another AIPR. A terminus AIPR recognizes a lead packet destined to a service that terminates at the AIPR by comparing the destination service socket number to the information provisioned in the AIPR's database.

If AIPR 4 422 has been so provisioned, AIPR 4 422 may restore the lead packet to its original form, i.e., the form the lead packet had when the source client 426 sent the lead packet, or as the packet might have been modified by the router 430, such as a result of network address translation (NAT) performed by the router 430. Thus, the lead packet may be restored to a form that does not include any of the modifications made by the waypoints 408, 414 and 418. AIPR 4 422 then forwards the lead packet to the destination service 428. Like AIPR 3 418, AIPR 4 422 stores information in its database identifying AIPR 3 418 as the previous AIPR for this session.

In the second scenario, AIPR 4 422 is not provisioned with information about the destination service 428. In such embodiments, AIPR 4 422 may operate much as AIPR 2 414 and AIPR 3 418 operate. AIPR 4 422 modifies and naturally forwards the lead packet, and the lead packet is eventually delivered to the destination service 428. The destination service 428 responds to the lead packet. For example, if the lead packet is a SYN packet to initiate a TCP session, the destination service 428 responds with an ACK or SYN/ACK packet. AIPR 4 422 recognizes the return packet as being part of the session, such as based on the source client/destination service network address/port number pairs in the return packet. Furthermore, because the return packet was sent by the destination service 428, and not another AIPR, AIPR 4 422 recognizes that it is the last AIPR along the path for this service.

AIPR 4 422 stores information in its database indicating AIPR 4 422 is a terminus AIPR. If AIPR 4 422 receives subsequent packets of the session, AIPR 4 422 may restore the subsequent packets to their original forms, i.e., the forms the subsequent packets had when the source client 426 sent the subsequent packets, or as the packets might have been modified by the router 430, such as a result of network address translation (NAT) performed by the router 430. AIPR 4 422 forwards the subsequent packets to the destination service 428.

AIPR 4 422 modifies the return packet to include a port number on the interface AIPR 4 422 received the lead packet from AIPR 3 418, as well as the network address of AIPR 4 422. AIPR 4 422, then forwards the return packet to AIPR 3 418. Although the return packet may be forwarded by other routers, AIPR 4 422 specifically addresses the return packet to AIPR 3 418. This begins the return packet's journey back along the path the lead packet traveled, through all the waypoints traversed by the lead packet, in reverse order. Thus, the return packet is not naturally routed back to the source client 426.

AIPR 3 418 receives the modified return packet and, because the return packet was addressed to the port number AIPR 3 418 previously assigned and associated with this session, AIPR 3 418 can assume the return packet is part of, or likely part of, the session. AIPR 3 418 copies the network address and port number of AIPR 4 422 from the return packet into the AIPR's database as the next waypoint for this session. If AIPR 3 418 receives subsequent packets of the session, AIPR 3 418 forwards them to the network address and port number of the next waypoint, i.e., AIPR 4 422.

Thus, once an AIPR is notified of a network address and port number of a next AIPR along a session path, the AIPR forwards subsequent packets to the next AIPR, rather than naturally routing the subsequent packets.

AIPR 3 418 forwards the return packet to AIPR 2 414, whose network address and port number were stored in the database of AIPR 3 418 and identified as the previous waypoint of the session. Likewise, each of the waypoints along the path back to the source client 426 forwards the return packet to its respective previous waypoint.

When the first waypoint, i.e., AIPR 1 408, receives the return packet, the waypoint may restore the return packet to its original form, i.e., the form the return packet had when the destination service 428 sent the return packet, or as the packet might have been modified by the router 430, such as a result of network address translation (NAT) performed by the router 430. Recall that the first waypoint set a flag in its database to indicate the lead packet had not traversed any other waypoint before reaching the first waypoint. This flag is used to signal the first waypoint to restore the return packet and forward the restored return packet to the source client 426. The first waypoint forwards the return packet to the source client 426. Subsequent return packets are similarly handled.

In the third scenario, not shown in FIG. 9, the last AIPR to receive the lead packet has a network address equal to the network address of the destination service. For example, the destination service network address may be given to a gateway router/AIPR, and the gateway router/AIPR may either process the service request or its router table may cause the packet to be forwarded to another node to perform the service. The last AIPR may restore the lead packet and subsequent packets, as described above.

It should be noted that although preferred embodiments use stateful routing as noted above, other embodiments do not use stateful routing.

Lead Packet Identification

As noted, a waypoint should be able to identify a lead packet of a session. Various techniques may be used to identify lead packets. Some of these techniques are protocol-specific. For example, a TCP session is initiated according to a well-known three-part handshake involving a SYN packet, a SYN-ACK packet and an ACK packet. By statefully following packet exchanges between pairs of nodes, a waypoint can identify a beginning of a session and, in many cases, an end of the session. For example, A TCP session may be ended by including a FIN flag in a packet and having the other node send an ACK, or by simply including an RST flag in a packet. Because each waypoint stores information about each session, such as the source client/destination service network address/port number pairs, the waypoint can identify the session with which each received packet is associated. The waypoint can follow the protocol state of each session by monitoring the messages and flags, such as SYN and FIN, sent by the endpoints of the session and storing state information about each session in its database. Such stateful monitoring of packet traffic is not taught by the prior art known to the inventor. Instead, the prior art teaches away from this type of session.

It should be noted that a SYN packet may be re-transmitted—each SYN packet does not necessarily initiate a separate session. However, the waypoint can differentiate between SYN packets that initiate a session and re-transmitted SYN packets based on, for example, the response packets.

Where a protocol does not define a packet sequence to end a session, the waypoint may use a timer. After a predetermined amount of time, during which no packet is handled for a session, the waypoint may assume the session is ended. Such a timeout period may also be applied to sessions using protocols that define end sequences.

Table 2 describes exemplary techniques for identifying the beginning and end of a session, according to various protocols. Similar techniques may be developed for other protocols, based on the definitions of the protocols.

TABLE 2

| Protocol | Destination Port | Technique for Start/End Determination |
| --- | --- | --- |
| TCP | Any | Detect start on the first SYN packet from a new address/port unique within the TCP protocol's guard time between address/port reuse. Following the TCP state machine to determine an end (FIN exchange, RST, or guard timeout). |
| UDP-TFTP | 69 | Trap on the first RRQ or WRQ message to define a new session, trap on an undersized DAT packet for an end of session. |
| UDP-SNMP | 161, 162 | Trap on the message type, including GetRequest, SetRequest, GetNextRequest, GetBulkRequest, InformRequest for a start of session, and monitor the Response for end of session. For SNMP traps, port 162 is used, and the flow of data generally travels in the "reverse" direction. |
| UDP-SYSLOG | 514 | A single message protocol, thus each message is a start of session, and end of session. |
| UDP-RTP | Any | RTP has a unique header structure, which can be reviewed/analyzed to identify a start of a session. This is not always accurate, but if used in combination with a guard timer on the exact same five-tuple address, it should work well enough. The end of session is detected through a guard timer on the five-tuple session, or a major change in the RTP header. |
| UDP-RTCP | Any | RTCP also has a unique header, which can be reviewed, analyzed, and harvested for analytics. Each RTCP packet is sent periodically and can be considered a "start of session" with the corresponding RTCP response ending the session. This provides a very high quality way of getting analytics for RTCP at a network middle point, without using a Session Border Controller |

TABLE 2-continued

| Protocol | Destination Port | Technique for Start/End Determination |
|---|---|---|
| UDP-DNS (Nameserver) | 53 | Each DNS query is a single UDP message and response. By establishing a forward session (and subsequent backward session) the Augmented router gets the entire transaction. This allows analytics to be gathered and manipulations that are appropriate at the Augmented router. |
| UDP-NTP | 123 | Each DNS query/response is a full session. So, each query is a start, and each response is an end. |

Figure 10:
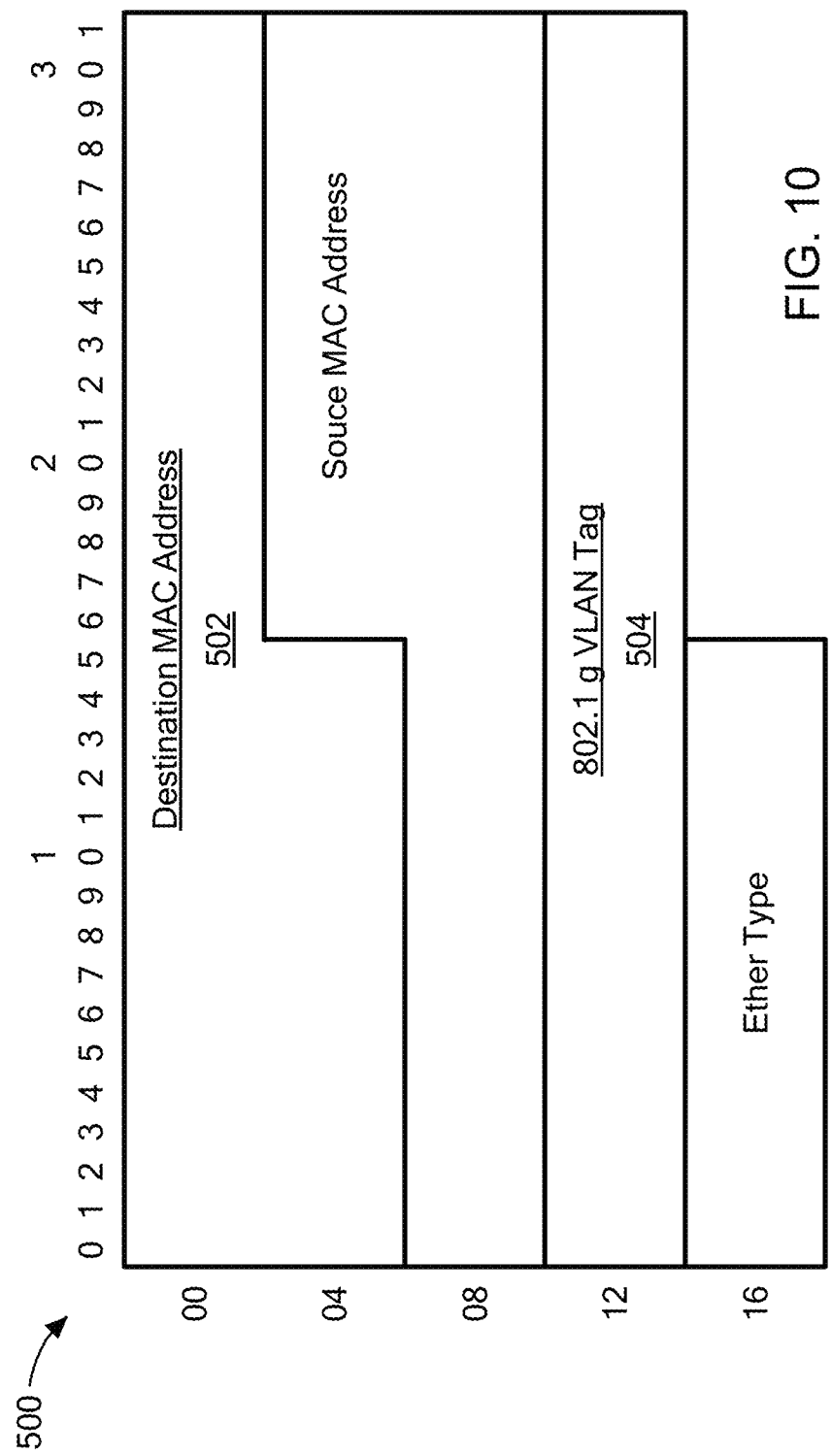
FIG. 10 schematically shows a layout of an Ethernet header, identifying fields used for identifying a beginning of a session, according to an embodiment of the present invention.
Figure 11:
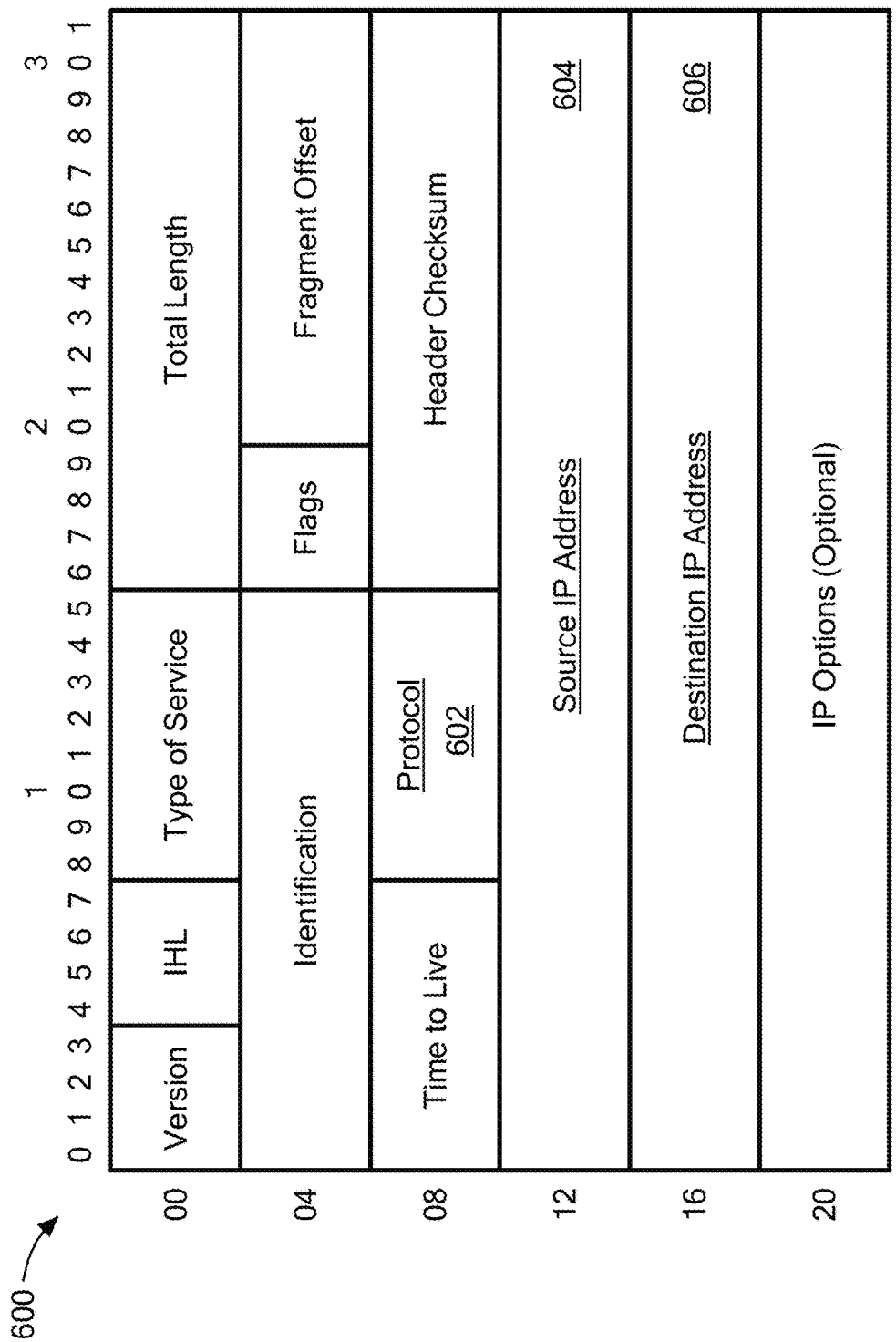
FIG. 11 schematically shows a layout of an IP header, identifying fields used for identifying a beginning of a session, according to an embodiment of the present invention.
Figure 12:
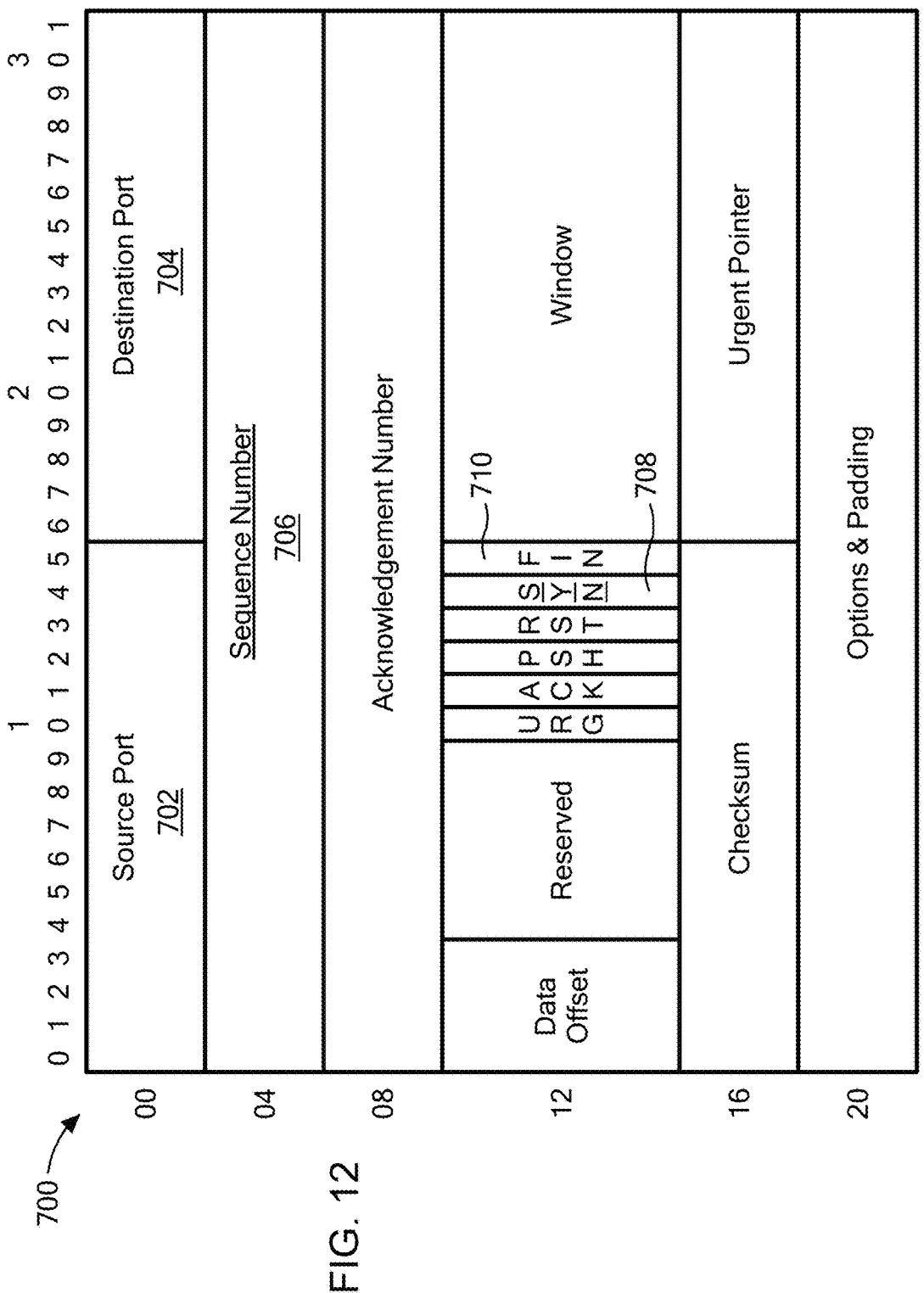
FIG. 12 schematically shows a layout of a TCP header, identifying fields used for identifying a beginning of a session, according to an embodiment of the present invention.

FIG. 10 is a schematic layout of an Ethernet header 500, including a Destination MAC Address 502 and an 802.1q VLAN Tag 504. FIG. 11 is a schematic layout of an IP header 600, including a Protocol field 602, a Source IP Address 604 and a Destination IP Address 606. FIG. 12 is a schematic layout of a TCP header 700, including a Source Port 702, a Destination Port 704, a Sequence Number 706, a SYN flag 708 and a FIN flag 710. These packets and the identified fields may be used to identify the beginning of a session, as summarized in Table 3.

TABLE 3

| Data Item | Where From | Description |
|---|---|---|
| Physical Interface | Ethernet Header | This is the actual port that the message was received on, which can be associated or discerned by the Destination MAC Address |
| Tenant | Ethernet Header OR Source MAD Address & Previous Advertisement | Logical association with a group of computers. |
| Protocol | IP Header | This defines the protocol in use and, for the TCP case, it must be set to a value that corresponds to TCP |
| Source IP Address | IP Header | Defines the source IP Address of the initial packet of a flow. |
| Destination IP Address | IP Header | Defines the destination IP Address of the initial packet of a flow. |
| Source Port | TCP Header | Defines the flow instance from the source. This may reflect a client, a firewall in front of the client, or a carrier grade NAT. |
| Destination Port | TCP Header | This defines the desired service requested, such as 80 for HTTP. |
| Sequence Number | TCP Header | This is a random number assigned by the client. It may be updated by a firewall or carrier grade NAT. |
| SYN Bit On | TCP Header | When the SYN bit is on, and no others, this is an initial packet of a session. It may be retransmitted if there is no response to the first SYN message. |

Augmented IP Router (AIPR)

Figure 13:
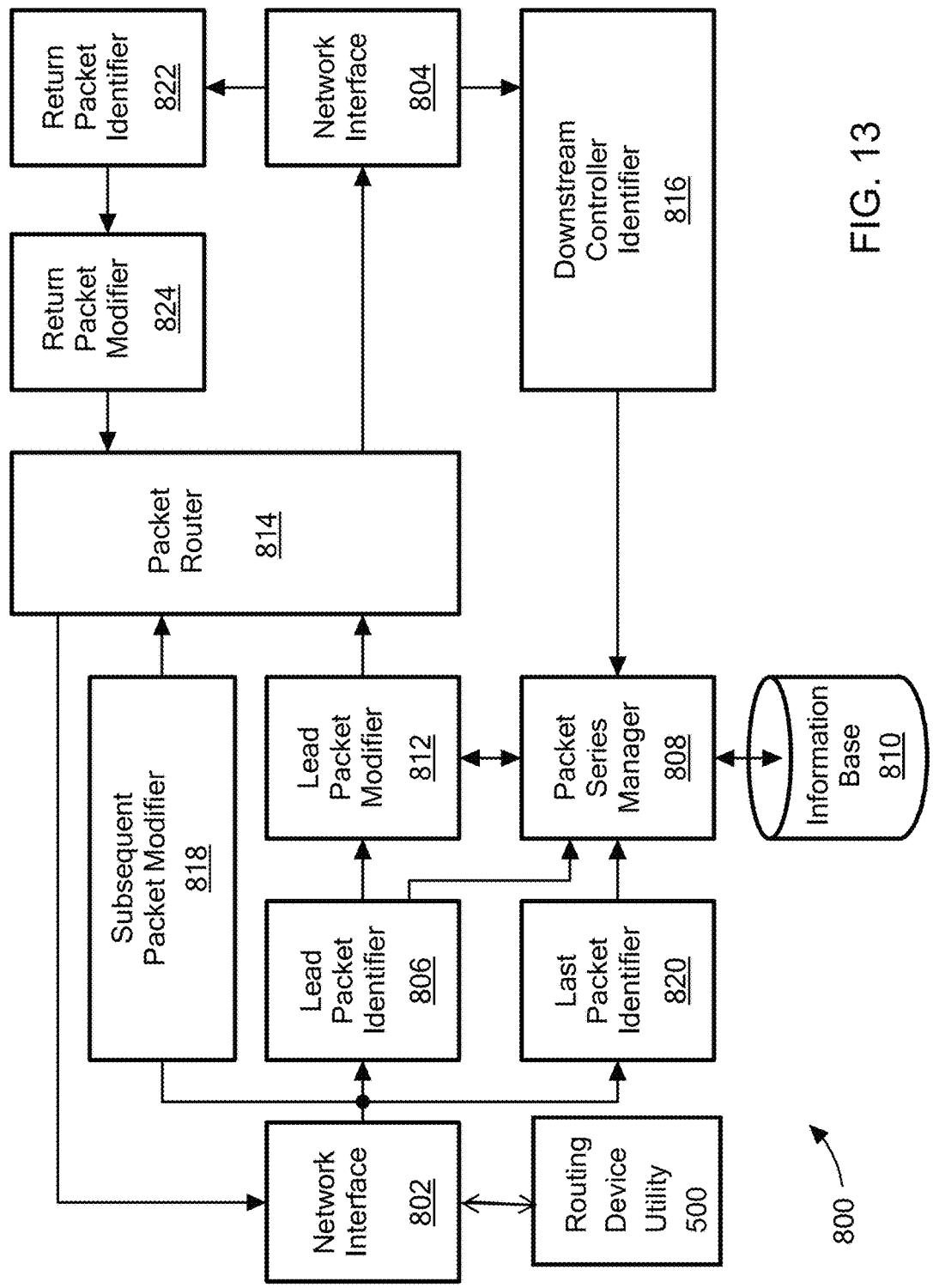
FIG. 13 schematically shows a block diagram of an AIPR of FIG. 9, according to an embodiment of the present invention.

FIG. 13 is a schematic block diagram of an AIPR (waypoint) 800 configured in accordance with illustrative embodiments of the invention. In preferred embodiments, the AIPR 800 includes the routing device utility 510 of FIG. 5. The AIPR 800 includes at least two network interfaces 802 and 804, through which the AIPR 800 may be coupled to two networks. The interfaces 802 and 804 may be, for example, Ethernet interfaces. The AIPR 800 may send and receive packets via the interfaces 802 and 804.

A lead packet identifier 806 automatically identifies lead packets, as discussed herein. In general, the lead packet identifier 806 identifies a lead packet when the lead packet identifier 806 receives a packet related to a session that is not already represented in the AIPR's information base 810, such as a packet that identifies a new source client/destination service network address/port number pair. As noted, each lead packet is an initial, non-dropped, packet of a series of packets (session). Each session includes a lead packet and at least one subsequent packet. The lead packet and all the subsequent packets are sent by the same source client toward the same destination service, for forward flow control. For forward and backward flow control, all the packets of the session are sent by either the source client or the destination service toward the other.

A session (packet series) manager 808 is coupled to the lead packet identifier 806. For each session, the session manager assigns a unique identifier. The unique identifier may be, for example, a combination of the network address of the AIPR 800 or of the interface 802, in combination with a first port number assigned by the session manager 808 for receiving subsequent packets of this session. The unique identifier may further include the network address of the AIPR 800 or of the other interface 804, in combination with a second port number assigned by the session manager 808 for transmitting the lead packet and subsequent packets. This unique identifier is associated with the session. The session manager 808 stores information about the session in an information base 810. This information may include the unique identifier, in association with the original source client/destination service network address/port number pairs.

Figure 14:
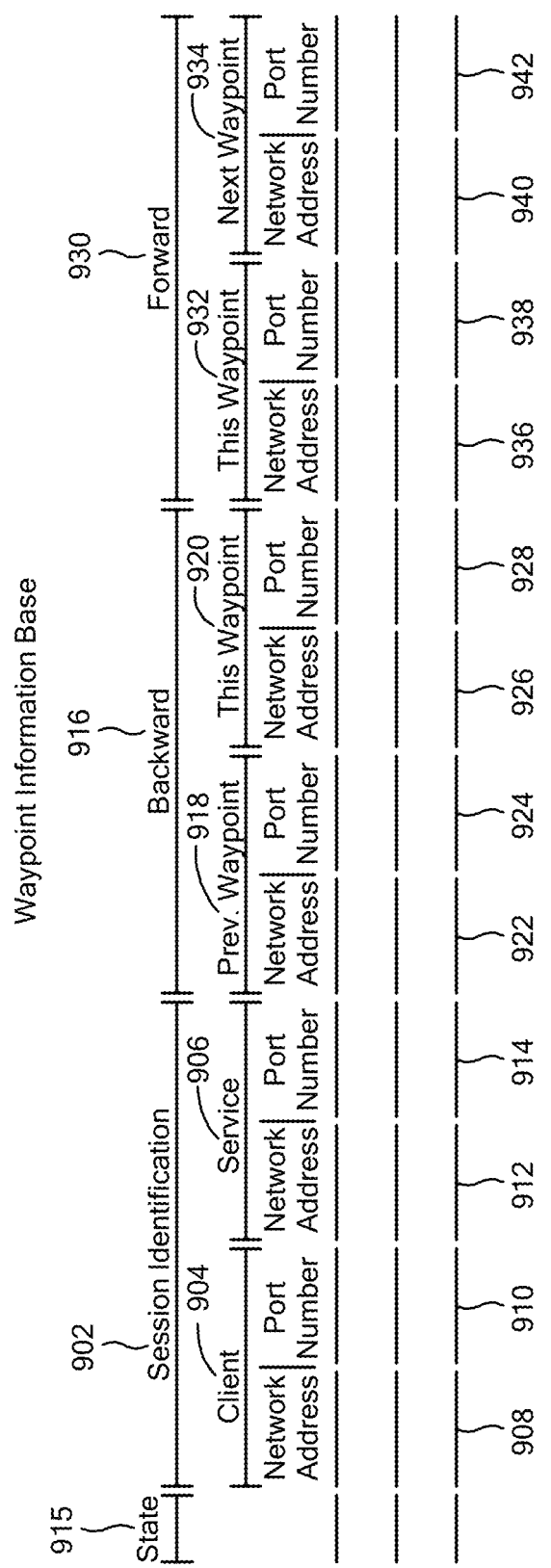
FIG. 14 shows a schematic illustration of information stored in an information base by the AIPR of FIGS. 9 and 13, according to an embodiment of the present invention.

FIG. 14 is a schematic layout of an exemplary waypoint information base 900. Each row represents a session. A session identification column 902 includes sub-columns for the source client 904 and the destination service 906. For each client 904, its network address 908 and port number 910 are stored. For each destination service 906, its network address 912 and port number 914 are stored. This information is extracted from the lead packet.

State information about the session may be stored in a state column 915. This information may be used to statefully follow a series of packets, such as when a session is being initiated or ended.

A backward column includes sub-columns for storing information 916 about a portion of the backward path, specifically to the previous AIPR. The backward path information 916 includes information 918 about the previous AIPR and information 920 about the present AIPR 800. The information 918 about the previous AIPR includes the AIPR's network address 922 and port number 924. The session manager 808 extracts this information from the lead packet, assuming the lead packet was forwarded by an AIPR. If, however, the present AIPR 800 is the first AIPR to process the lead packet, the information 918 is left blank as a flag. The information 920 about the present AIPR 800 includes the network address 926 of the interface 802 over which the lead packet was received, as well as the first port number 928 assigned by session manager 808.

The waypoint information base 900 is also configured to store information 930 about a portion of the forward path, specifically to the next AIPR. This information 930 includes information 932 about the present AIPR 800 and information 934 about the next AIPR along the path, assuming there is a next AIPR. The information 932 includes the network address 936 of the interface over which the present AIPR will send the lead packet and subsequent packets, as well as the second port number 938 assigned by the session manager 808. The information 934 about the next AIPR along the path may not yet be available, unless the AIPR is provisioned with information about the forward path. The information 934 about the next AIPR includes its network address 940 and port number 942. If the information 934 about the next AIPR is not yet available, the information 934 may be filled in when the AIPR 800 processes a return packet, as described below.

Some embodiments of the waypoint information base 900 may include the forward information 930 without the backward information 916. Other embodiments of the waypoint information base 900 may include the backward information 916 without the forward information 930. Statistical information may be gathered and/or calculated using either or both forward and backward information 916.

Returning to FIG. 13, a lead packet modifier 812 is coupled to the session manager 808. The lead packet modifier 812 modifies the lead packet to store the unique identifier associated with the session. The original source client network address/port number pair, and the original destination service network address/port number pair, are stored in the modified lead packet, if necessary. The lead packet may be enlarged to accommodate the additional information stored therein, or existing space within the lead packet, such a vendor specific attribute field, may be used. Other techniques for transmitting additional information are protocol specific, for example with TCP, the additional information could be transmitted as a TCP Option field, or added to the SYN packet as data. In either case, the term session data block is used to refer to the information added to the modified lead packet.

Figure 15:
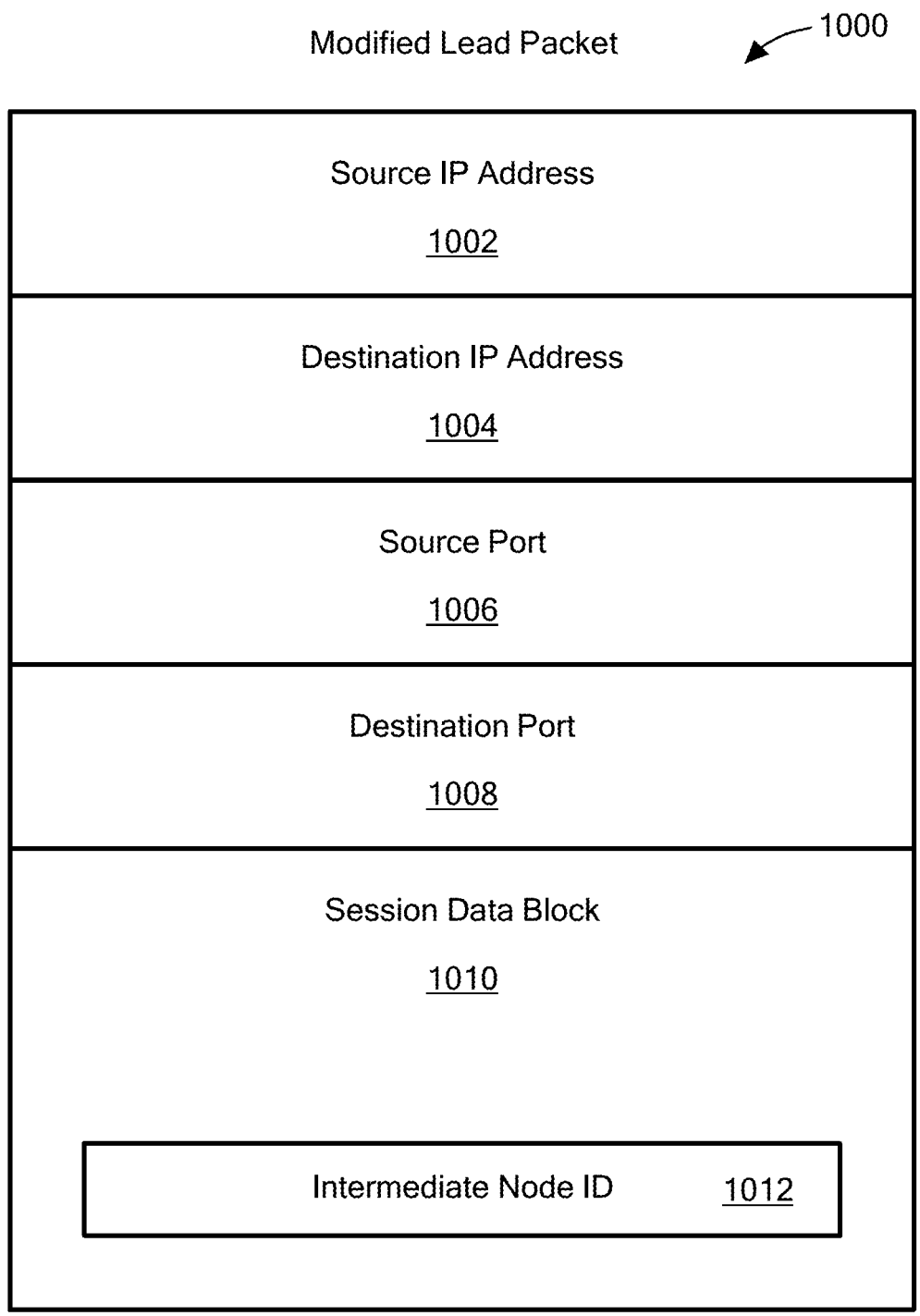
FIG. 15 schematically shows a modified lead packet produced by the AIPR of FIG. 10, according to an embodiment of the present invention.

FIG. 15 is a schematic diagram of an exemplary modified lead packet 1000 showing the original source and destination IP addresses 1002 and 1004, respectively, and the original source and destination port numbers 1006 and 1008, respectively. FIG. 15 also shows a session data block 1010 in the modified lead packet 1000. Although the session data block 1010 is shown as being contiguous, it may instead have its contents distributed throughout the modified lead packet 1000. The session data block 1010 may store an identification of the sending AIPR, i.e., an intermediate node identifier 1012, such as the network address of the second network interface 804 and the second port number.

Returning to FIG. 13, the lead packet modifier 812 updates the packet length, if necessary, to reflect any enlargement of the packet. The lead packet modifier 812 updates the checksum of the packet to reflect the modifications made to the packet. The modified lead packet is then transmitted by a packet router 814, via the second network interface 804. The modified lead packet is naturally routed, unless the AIPR 800 has been provisioned with forward path information.

Eventually, the destination service sends a return packet. The AIPR 800 receives the return packet via the second interface 804. If another AIPR (downstream AIPR) between the present AIPR 800 and the destination service handles the lead packet and the return packet, the downstream AIPR modifies the return packet to include the downstream AIPR's network address and a port number. A downstream controller 816 identifier uses stateful inspection, as described herein, to identify the return packet. The downstream controller 816 stores information 934 (FIG. 14), specifically the network address and port number, about the next AIPR in the waypoint information base 900.

The present AIPR 800 may use this information to address subsequent packets to the next AIPR. Specifically, a subsequent packet modifier 818 may set the destination address of the subsequent packets to the network address and port number 940 and 942 (FIG. 14) of the next waypoint, instead of directly to the destination service. The packet router 814 sends the subsequent packets, according to their modified destination addresses. Thus, for each series of packets, subsequent packets flow through the same downstream packet flow controllers as the lead packet of the series of packets.

A last packet identifier 820 statefully follows each session to identify an end of each stream, as discussed above. As noted, in some cases, the end is signified by a final packet, such as a TCP packet with the RST flag set or a TCP ACK packet in return to a TCP packet with the FIN flag set. In other cases, the end may be signified by a timer expiring. When the end of a session is detected, the packet series manager 808 disassociates the unique identifier from the session and deletes information about the session from the waypoint information base 900.

Where the AIPR 800 is provisioned to be a last AIPR before a destination service, the lead packet modifier 806 restores the lead packet to the state the lead packet was in when the source client sent the lead packet, or as the lead packet was modified, such as a result of network address translation (NAT). Similarly, the subsequent packet modifier 818 restores subsequent packets.

Similarly, if the destination address of the lead packet is the same as the network address of the AIPR 800, or its network interface 802 over which it receives the lead packets, the lead packet modifier 806 and the subsequent packet modifier 818 restore the packet and subsequent packets.

As noted, in some protocols, several packets are required to initiate a session, as with the SYN-SYN/ACK-ACK handshake of the TCP. Thus, the downstream controller identifier 816 may wait until a second return packet is received from the destination service before considering a session as having started.

As noted, some embodiments of the waypoint 800 also manage return packet paths. The lead packet identifier 806 automatically ascertains whether a lead packet was forwarded to the waypoint 800 by an upstream waypoint. If the lead packet includes a session data block, an upstream waypoint forwarded the lead packet. The packet series manager 808 stores information about the upstream waypoint in the waypoint information base 810. A return packet identifier 822 receives return packets from the second network interface 804 and automatically identifies return packets of the session. These return packets may be identified by destination address and port number being equal to the information 932 (FIG. 14) in the waypoint information base corresponding to the session. A return packet modifier modifies the return packets to address them to the upstream waypoint for the session, as identified by the information 918 in the waypoint information base 900.

Figure 16:
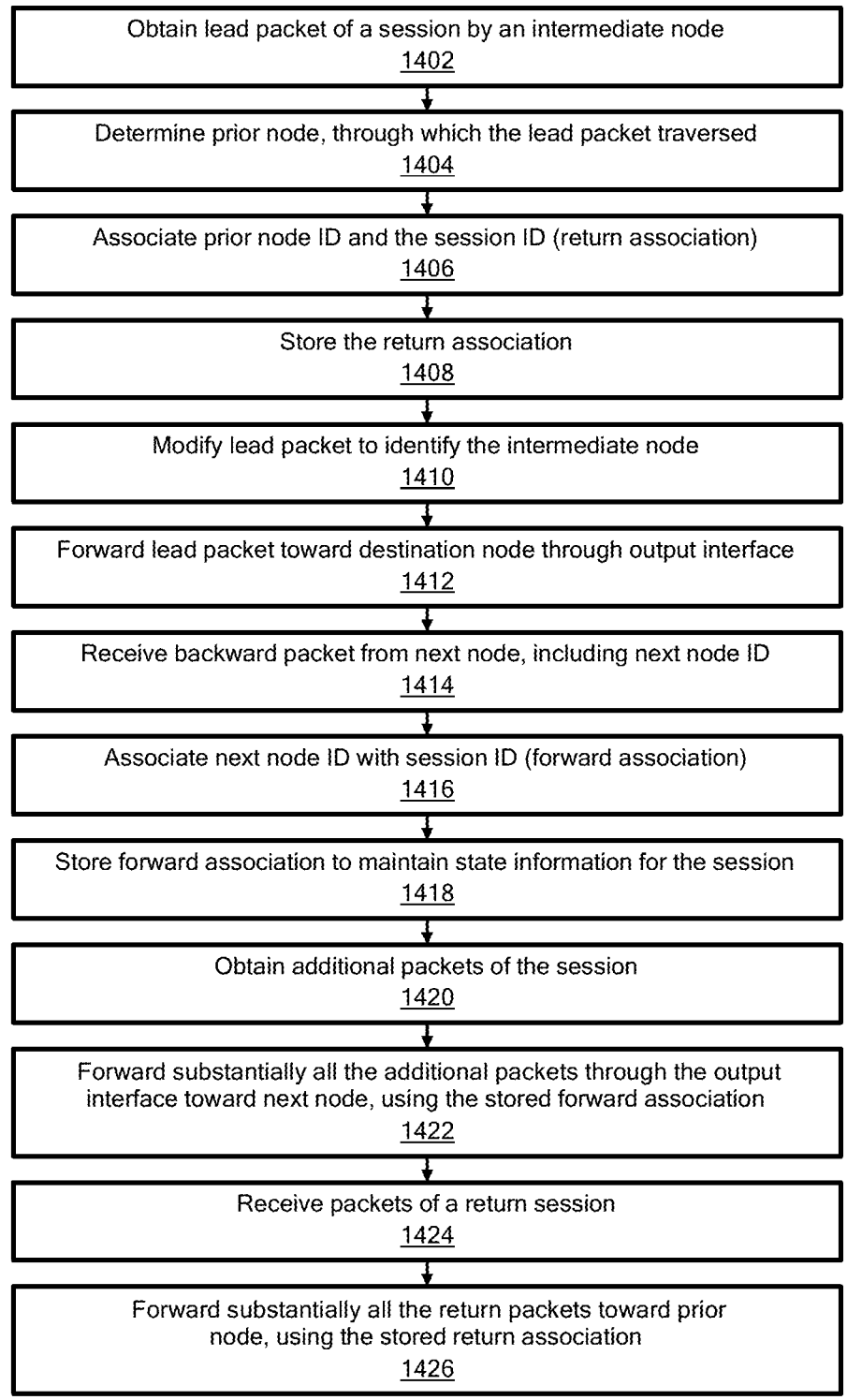
FIGS. 16 and 17 show flowcharts illustrating operations performed by the AIPR of FIGS. 9 and 13, according to an embodiment of the present invention.

FIG. 16 shows a flowchart schematically illustrating some operations performed by the AIPR 800 (FIG. 13) in accordance with illustrative embodiments of the invention. The flowchart illustrates a packet routing method for directing packets of a session from an originating node toward a destination node in an IP network. At 1402, an intermediate node obtains a lead packet of a plurality of packets in a session. The intermediate node may include a routing device or a switching device that performs a routing function.

The packets in the session have a unique session identifier. At 1404, a prior node, through which the lead packet traversed, is determined. The prior node has a prior node identifier. At 1406, a return association is formed between the prior node identifier and the session identifier. At 1408, the return association is stored in memory to maintain state information for the session.

At 1410, the lead packet is modified to identify at least the intermediate node. At 1412, the lead packet is forwarded toward the destination node though an intermediate node electronic output interface to the IP network. The electronic output interface is in communication with the IP network. At 1414, a backward message (e.g., a packet, referred to as a "backward packet") is received through an electronic input interface of the intermediate node. The backward message is received from a next node. The next node has a next node identifier. The backward message includes the next node identifier and the session identifier. The electronic input interface is in communication with the IP network.

At 1416, a forward association is formed between the next node identifier and the session identifier. At 1418, the forward association is stored in memory, to maintain state information for the session. At 1420, additional packets of the session are obtained. At 1422, substantially all of the additional packets in the session are forwarded toward the next node, using the stored forward association. The additional packets are forwarded through the electronic output interface of the intermediate node.

At 1424, a plurality of packets is received in a return session, or a return portion of the session, from the destination. The return session is addressed toward the originating node. At 1426, substantially all the packets in the return session are forwarded toward the prior node, using the stored return association. The packets are forwarded through the electronic output interface.

Figure 17:
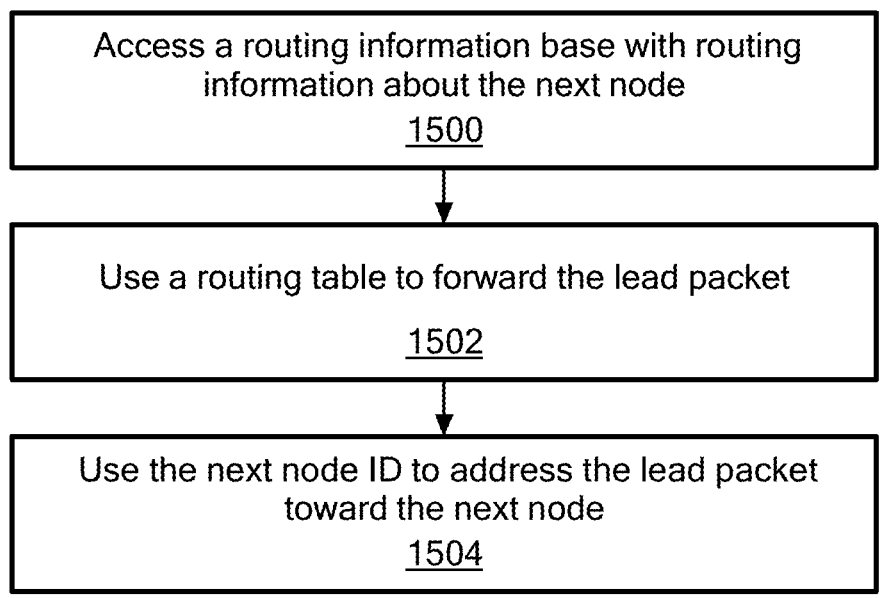

As shown at 1500 in FIG. 17, forwarding the lead packet 1412 toward the destination node may include accessing a routing information base having routing information for the next node. As shown at 1502, the intermediate node may have a routing table, and forwarding the lead packet 1412 toward the destination node may include using the routing table to forward the lead packet toward the destination node. As shown at 1504, forwarding the lead packet 1412 toward the destination node may include using the next node identifier to address the lead packet toward the next node.

The lead packet may be addressed so that a plurality of network devices receive the lead packet after it is forwarded and before the next node receives the lead packet.

An AIPR 800 and all or a portion of its components 802-824 may be implemented by a processor executing instructions stored in a memory, hardware (such as combinatorial logic, Application Specific Integrated Circuits (ASICs), Field-Programmable Gate Arrays (FPGAs) or other hardware), firmware or combinations thereof. In a similar manner, the routing device utility 510 also may be implemented by a processor executing instructions stored in a memory, hardware (such as combinatorial logic, Application Specific Integrated Circuits (ASICs), Field-Programmable Gate Arrays (FPGAs) or other hardware), firmware or combinations thereof.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A routing device for routing packets across a computer network, the routing device comprising:
   a path checker configured to check a network path selected for transmitting a stream of packets between a first routing node and a second routing node in the computer network, the stream of packets complying with a first transport protocol, each packet in the stream of packets having a first transport protocol header;
   an interface operably coupled with the path checker, the interface configured to forward, from the first routing node toward the second routing node, a set of handshake packets in response to detection of a communication disruption along the network path by the path checker, the set of handshake packets including change information indicating a change in the transport protocol for a plurality of the packets in the stream;
   a packet changer operatively coupled with the path checker and the interface, the packet changer configured to modify the plurality of packets in the stream ("modified packets"), the packet changer further being configured to modify the first transport protocol header in the plurality of packets in the stream to comply with a second transport protocol header of a second transport protocol, the packet changer further configured to move first header information from a first location in the header of the first transport protocol header to another location in the packet, and write second header information in the first location, the second header information complying with the second transport protocol, the modified packets having an initial packet size before modification, the modified packets having a modified packet size after modification, the packet changer configured to modify each first transport protocol header of the plurality of packets in the stream so that each modified packet size is no greater than the initial packet size, the modified packets in the stream being different from the set of handshake packets; and the interface being configured to forward the modified packets toward the second routing node.

2. The routing device as defined by claim 1 wherein the size of each packet of the set of handshake packets is greater than the packet size of the modified packets.

3. The routing device as defined by claim 2 wherein the packet changer is configured to modify a set of the stream of packets to form the set of handshake packets, further wherein the set of handshake packets includes metadata having the change information.

4. The routing device as defined by claim 1 further comprising a reconstructor operatively coupled with the interface, the reconstructor being configured to reconstruct received modified packets from the second routing node to include the first transport protocol header.

5. The routing device as defined by claim 1 wherein the stream of packets is part of a session between the first and second routing nodes, further wherein the path checker is configured to detect the communication disruption along the network path before transmission of the stream of packets between the first routing node and the second routing node, further wherein the packet changer is configured to modify the plurality of packets in the stream before completing initiation of the session.

6. The routing device as defined by claim 1 wherein the first transport protocol header includes error checking data, further wherein the second protocol header is free of error checking data.

7. The routing device as defined by claim 1 wherein the stream of packets is part of a stateful session between the first and second routing nodes, the first routing node maintaining state information for the session in memory.

8. The routing device as defined by claim 1 further comprising the first routing node.

9. The routing device as defined by claim 1 wherein the path checker is configured to forward a set of test packets from the first routing node toward the second routing node along the network path, the network path having the communication disruption if the path checker does not receive an acknowledgement message from the second routing node within a prescribed period, the acknowledgement message having receipt information indicating receipt of the set of test packets from the first routing node.

10. The routing device as defined by claim 9 wherein the interface is configured to forward, in response to receipt of the acknowledgement message, the plurality of packets in the stream from the first routing node toward the second routing node using the first transport protocol.

11. The routing device as defined by claim 9 wherein the interface is configured to forward, in response to not receiving the acknowledgement message, the plurality of packets in the stream from the first routing node toward the second routing node using the second transport protocol.

12. A method of routing a stream of packets across a computer network, the method comprising:

checking a network path selected to transmit the stream of packets between a first routing node and a second routing node in the computer network, the stream of packets complying with a first transport protocol, each packet in the stream of packets having a first transport protocol header;

forwarding, from the first routing node toward the second routing node, a set of handshake packets in response to said checking detecting a communication disruption along the network path, the set of handshake packets including change information indicating a change in the transport protocol for a plurality of the packets in the stream;

protocol modifying the plurality of packets in the stream ("modified packets"), protocol modifying comprising modifying the first transport protocol header in the plurality of packets in the stream to comply with a second transport protocol header of a second transport protocol, protocol modifying further comprising moving first header information from a first location in the header of the first transport protocol header to another location in the packet, and writing second header information in the first location, the second header information complying with the second transport protocol, protocol modifying not increasing the packet size of each of the modified packets, the modified packets in the stream being different from the set of handshake packets; and forwarding the modified packets toward the second routing node.

13. The method as defined by claim 12 wherein the size of each packet of the set of handshake packets is greater than the packet size of the modified packets.

14. The method as defined by claim 13 further comprising modifying a set of the stream of packets to form the set of handshake packets, further wherein the set of handshake packets includes metadata having the change information.

15. The method as defined by claim 12 wherein checking comprises forwarding a set of test packets from the first routing node toward the second routing node along the network path, the network path having the communication disruption if the first routing node does not receive an acknowledgement message from the second routing node within a prescribed period, the acknowledgement message having receipt information indicating receipt of the set of test packets from the first routing node.

16. The method as defined by claim 12 further comprising reconstructing the modified packets to include the first transport protocol header after receipt by the second routing node.

17. The method as defined by claim 12 wherein the stream of packets is part of a session between the first and second routing nodes, further wherein checking comprises detecting the communication disruption along the network path before transmission of the stream of packets between the first routing node and the second routing node, further wherein protocol modifying comprises modifying the plurality of packets in the stream before completing initiation of the session.

18. The method as defined by claim 12 wherein the first transport protocol header includes error checking data, further wherein the second protocol header is free of error checking data.

19. The method as defined by claim 12 wherein the stream of packets is part of a stateful session between the first and second routing nodes, the first routing node maintaining state information for the session in memory.

20. A computer program product for use on a computer system for routing packets across a computer network, the computer program product comprising a tangible, non-transient computer usable medium having computer readable program code thereon, the computer readable program code comprising:

program code for checking a network path selected to transmit a stream of packets between a first routing node and a second routing node in the computer network, the stream of packets complying with a first transport protocol, each packet in the stream of packets having a first transport protocol header;

program code for forwarding, from the first routing node toward the second routing node, a set of handshake packets in response to the program code for checking detecting a communication disruption along the network path, the set of handshake packets including change information indicating a change in the transport protocol for a plurality of the packets in the stream;

program code for modifying a plurality of packets in the stream ("modified packets"), the program code for modifying comprising program code for modifying the first transport protocol header in the plurality of packets in the stream to comply with a second transport protocol header of a second transport protocol, the program code for modifying the plurality of packets further comprising program code for moving first header information from a first location in the header of the first transport protocol header to another location in the packet, and program code for writing second header information in the first location, the second header information complying with the second transport protocol, the program code for modifying the first transport protocol header comprising not increasing the packet size in each of modified packets, the modified packets in the stream being different from the set of handshake packets; and program code for forwarding the modified packets toward the second routing node.

21. The computer program product as defined by claim 20 wherein the size of each packet of the set of handshake packets is greater than the packet size of the modified packets.

22. The computer program product as defined by claim 21 further comprising program code for modifying a set of the stream of packets to form the set of handshake packets, further wherein the set of handshake packets includes metadata having the change information.

23. The computer program product as defined by claim 20 wherein the program code for checking comprises program code for forwarding a set of test packets from the first routing node toward the second routing node along the network path, the network path having the communication disruption if the first routing node does not receive an acknowledgement message from the second routing node within a prescribed period, the acknowledgement message having receipt information indicating receipt of the set of test packets from the first routing node.

24. The computer program product as defined by claim 20 wherein the program code for checking comprises:

program code for forwarding a set of test packets from the first routing node toward the second routing node along the network path;

program code for receiving an acknowledgement message from the second routing node, the acknowledgement message having receipt information indicating receipt of the set of test packets from the first routing node; and program code for forwarding, in response to receipt of the acknowledgement message, the plurality of packets in the stream from the first routing node toward the second routing node using the first transport protocol.

25. The computer program product as defined by claim 20 further comprising program code for reconstructing the modified packets to include the first transport protocol header after receipt by the second routing node.

26. The computer program product as defined by claim 20 wherein the stream of packets is part of a session between the first and second routing nodes, further wherein the program code for checking comprises program code for detecting the communication disruption along the network path before transmission of the stream of packets between the first routing node and the second routing node, further wherein the program code for modifying the plurality of packets comprises program code for modifying the plurality of packets in the stream before completing initiation of the session.

27. The computer program product as defined by claim 20 wherein the first transport protocol header includes error checking data, further wherein the second protocol header is free of error checking data.

28. The computer program product as defined by claim 20 wherein the stream of packets is part of a stateful session between the first and second routing nodes, the first routing node maintaining state information for the session in memory.

* * * * *